United States Patent
Raymond

(10) Patent No.: US 12,134,038 B2
(45) Date of Patent: *Nov. 5, 2024

(54) METHODS AND SYSTEMS FOR GENERATING PROXY LEVEL OF DETAIL VISUAL ASSETS IN A VIDEO GAME

(71) Applicant: Activision Publishing, Inc., Santa Monica, CA (US)

(72) Inventor: Rulon Joseph Raymond, Los Angeles, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/366,205

(22) Filed: Aug. 7, 2023

(65) Prior Publication Data
US 2023/0372817 A1    Nov. 23, 2023

Related U.S. Application Data

(63) Continuation of application No. 17/037,309, filed on Sep. 29, 2020, now Pat. No. 11,717,753.

(51) Int. Cl.
*A63F 13/537* (2014.01)
*G06F 3/0482* (2013.01)
(Continued)

(52) U.S. Cl.
CPC .......... *A63F 13/537* (2014.09); *G06F 3/0482* (2013.01); *G06F 3/04847* (2013.01);
(Continued)

(58) Field of Classification Search
CPC ........ A63F 13/52; A63F 13/537; A63F 13/35; A63F 2300/6615; G06T 15/005; G06T 17/20

See application file for complete search history.

(56) References Cited

U.S. PATENT DOCUMENTS

| 5,530,796 A | 6/1996 | Wang |
| 5,561,736 A | 10/1996 | Moore |

(Continued)

FOREIGN PATENT DOCUMENTS

| AU | 768367 | 3/2004 |
| AU | 2005215048 | 10/2011 |

(Continued)

OTHER PUBLICATIONS

Erikson, "Hierarchical Levels of Detail to Accelerate the Rendering of Large Static and Dynamic Polygonal Environments" University of NC Chapel Hill 2000 (Year: 2000).

(Continued)

*Primary Examiner* — Chase E Leichliter
(74) *Attorney, Agent, or Firm* — Novel IP

(57) ABSTRACT

A method for generating at least one proxy level of detail (LOD) visual asset for contents of a grid cell of a game map is described. A LOD management engine receives data indicative of grid cell contents and at least one function is applied to the data. The LOD engine generates a base proxy LOD visual asset representative of the data and an associated base proxy switch distance as a result of the applying, received by a LOD management module which generates a first proxy LOD visual asset by iteratively reducing a polygon mesh complexity of the base proxy LOD visual asset until a maximum geometric deviation of the first proxy LOD visual asset approaches a predefined threshold value. The LOD management module generates a first proxy switch distance at which the predefined threshold value, when projected on a display of a default resolution, comprises a predefined number of pixels.

22 Claims, 11 Drawing Sheets

(51) Int. Cl.
  *G06F 3/04847* (2022.01)
  *G06T 15/00* (2011.01)
  *G06T 17/20* (2006.01)
(52) U.S. Cl.
  CPC ............ *G06T 15/005* (2013.01); *G06T 17/20* (2013.01); *G06T 2200/24* (2013.01)

(56) References Cited

U.S. PATENT DOCUMENTS

| | | |
|---|---|---|
| 5,563,946 A | 10/1996 | Cooper |
| 5,685,775 A | 11/1997 | Bakoglu |
| 5,706,507 A | 1/1998 | Schloss |
| 5,708,764 A | 1/1998 | Borrel |
| 5,736,985 A | 4/1998 | Lection |
| 5,737,416 A | 4/1998 | Cooper |
| 5,745,678 A | 4/1998 | Herzberg |
| 5,764,232 A | 6/1998 | Oouchi |
| 5,768,511 A | 6/1998 | Galvin |
| 5,825,877 A | 10/1998 | Dan |
| 5,835,692 A | 11/1998 | Cragun |
| 5,878,233 A | 3/1999 | Schloss |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,923,324 A | 7/1999 | Berry |
| 5,969,724 A | 10/1999 | Berry |
| 5,977,979 A | 11/1999 | Clough |
| 5,990,888 A | 11/1999 | Blades |
| 6,014,145 A | 1/2000 | Bardon |
| 6,025,839 A | 2/2000 | Schell |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,311,206 B1 | 10/2001 | Malkin |
| 6,334,141 B1 | 12/2001 | Varma |
| 6,336,134 B1 | 1/2002 | Varma |
| 6,337,700 B1 | 1/2002 | Kinoe |
| 6,353,449 B1 | 3/2002 | Gregg |
| 6,356,297 B1 | 3/2002 | Cheng |
| 6,411,312 B1 | 6/2002 | Sheppard |
| 6,421,051 B1 | 7/2002 | Kato |
| 6,426,750 B1 | 7/2002 | Hoppe |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,469,712 B1 | 10/2002 | Hilpert, Jr. |
| 6,473,085 B1 | 10/2002 | Brock |
| 6,499,053 B1 | 12/2002 | Marquette |
| 6,505,208 B1 | 1/2003 | Kanevsky |
| 6,525,731 B1 | 2/2003 | Suits |
| 6,549,933 B1 | 4/2003 | Barrett |
| 6,567,109 B1 | 5/2003 | Todd |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,765,574 B1 * | 7/2004 | Mao ................ G06T 17/005 |
| | | 345/428 |
| 6,765,596 B2 | 7/2004 | Lection |
| 6,781,607 B1 | 8/2004 | Benham |
| 6,819,669 B2 | 11/2004 | Rooney |
| 6,832,239 B1 | 12/2004 | Kraft |
| 6,836,480 B2 | 12/2004 | Basso |
| 6,886,026 B1 | 4/2005 | Hanson |
| 6,948,168 B1 | 9/2005 | Kuprionas |
| RE38,865 E | 11/2005 | Dumarot |
| 6,993,596 B2 | 1/2006 | Hinton |
| 7,028,296 B2 | 4/2006 | Irfan |
| 7,062,533 B2 | 6/2006 | Brown |
| 7,143,409 B2 | 11/2006 | Herrero |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |

(56) References Cited

U.S. PATENT DOCUMENTS

| | | |
|---|---|---|
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | Mcvey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,243,064 B1 * | 8/2012 | Moravanszky .......... G06F 30/20 |
| | | 345/473 |
| 8,245,241 B2 | 8/2012 | Hamilton, II |
| 8,245,283 B2 | 8/2012 | Dawson |
| 8,265,253 B2 | 9/2012 | D Amora |
| 8,281,281 B1 | 10/2012 | Smyrl |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,390,623 B1 * | 3/2013 | Guskov .................. G06T 19/00 |
| | | 345/428 |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,147,288 B1 * | 9/2015 | Johnston ................ G06T 17/00 |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,384,593 B2 | 7/2016 | Anttila |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 9,898,838 B2 | 2/2018 | Shim |
| 9,905,160 B2 | 2/2018 | Kim |
| 10,664,942 B2 * | 5/2020 | Paltashev .............. G06T 15/005 |
| 10,792,566 B1 | 10/2020 | Schmid |
| 11,717,753 B2 * | 8/2023 | Raymond ........... G06F 3/04847 |
| | | 463/31 |
| 11,724,188 B2 * | 8/2023 | Raymond ............... G06T 17/20 |
| | | 463/31 |
| 2005/0146524 A1 | 7/2005 | Gueziec |
| 2005/0179689 A1 | 8/2005 | Ohshima |
| 2005/0253843 A1 * | 11/2005 | Losasso Petterson .. G06T 17/05 |
| | | 345/428 |
| 2006/0080072 A1 | 4/2006 | Lachman |
| 2007/0198363 A1 | 8/2007 | Quoc |
| 2007/0198364 A1 | 8/2007 | Quoc |
| 2008/0001963 A1 | 1/2008 | Lefebvre |
| 2009/0062000 A1 | 3/2009 | Tanaka |
| 2009/0113448 A1 | 4/2009 | Smith |

(56) References Cited

U.S. PATENT DOCUMENTS

| | | | |
|---|---|---|---|
| 2014/0198103 A1 | 7/2014 | Johansson | |
| 2014/0344725 A1 | 11/2014 | Bates | |
| 2015/0024852 A1 | 1/2015 | Pacey | |
| 2016/0191671 A1 | 6/2016 | Dawson | |
| 2017/0091992 A1* | 3/2017 | Rogers | G06T 17/20 |
| 2017/0200301 A1* | 7/2017 | Boissé | G06T 17/05 |
| 2019/0192970 A1* | 6/2019 | Garbut | A63F 13/52 |
| 2019/0192972 A1* | 6/2019 | Garbut | A63F 13/52 |
| 2019/0355331 A1* | 11/2019 | Wood | G06F 3/14 |
| 2020/0001180 A1* | 1/2020 | Turner | H04L 67/63 |
| 2020/0045285 A1* | 2/2020 | Varerkar | G06N 3/08 |
| 2020/0269132 A1* | 8/2020 | Turner | A63F 13/31 |
| 2020/0368616 A1* | 11/2020 | Delamont | H04N 13/239 |
| 2021/0158597 A1* | 5/2021 | Hagland | A63F 13/355 |
| 2021/0194794 A1* | 6/2021 | Turner | A63F 13/216 |
| 2021/0329270 A1* | 10/2021 | Yea | H04N 19/174 |
| 2022/0019573 A1* | 1/2022 | Gautron | G06F 9/46 |
| 2022/0028161 A1 | 1/2022 | Lawrence | |
| 2022/0053224 A1 | 2/2022 | Katsumata | |
| 2022/0096931 A1* | 3/2022 | Raymond | G06F 3/04847 |
| 2022/0096932 A1* | 3/2022 | Raymond | G06T 15/005 |
| 2022/0096933 A1* | 3/2022 | Raymond | G06F 3/0482 |
| 2023/0372817 A1* | 11/2023 | Raymond | A63F 13/53 |
| 2023/0390639 A1* | 12/2023 | Raymond | A63F 13/35 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

Heok et al. "A Review on Level of Detail" Proceedings of the International Conference on Computer Graphics, Imaging and Visualization (CGIV'04) 2004 (Year: 2004).

Forsman, "Automatic LOD selection" Department of Science and Technology Linköping University Oct. 20, 2017 (Year: 2017).

Unity User Manual 2019.4 accessed from hhttps://web.archive.org/web/20200917105747/https://docs.unity3d.com/Manual/ class-LODGroup.html andhttps://web.archive.org/web/20200921105526/https://docs.unity3d.com/Manual/LevelOfDetail.html(Year: 2019).

* cited by examiner

METHODS AND SYSTEMS FOR GENERATING PROXY LEVEL OF DETAIL VISUAL ASSETS IN A VIDEO GAME

CROSS-REFERENCE

The present application is a continuation application of U.S. patent application Ser. No. 17/037,309, titled "Methods and Systems for Generating Modified Level of Detail Visual Assets in a Video Game" and filed on Sep. 29, 2020, which is incorporated by reference herein in its entirety.

FIELD

The present specification is related generally to the field of video games and graphics processing. More specifically the present specification is related to offline automated generation of level of detail (LOD) assets, manual optimization of the auto-generated LOD assets as well as dynamic selection and rendering of the optimized LOD assets, during runtime.

BACKGROUND

Objects in a video game scene are typically modeled as three-dimensional meshes comprising geometric primitives such as, for example, triangles or other polygons whose coordinate points are connected by edges. For rendering and displaying such three-dimensional meshes or object models, large numbers of computations need to be performed in order to determine the locations of, and complex interactions with, those coordinate points and edges.

While the desired levels of geometric detail in games are increasing, gaming hardware (personal computer as well as console based) are not necessarily advancing as fast in order to manage the computationally intensive workload of rendering and displaying highly complex polygonal meshes. One way to address this technical challenge is to increase geometric detail when virtual objects are closer to a virtual camera position in a game and decrease geometric detail when virtual objects are further away from the virtual camera's position. This is a known technical approach, referred to as Level of Detail or LOD. There are many challenges in implementing an LOD approach, but, at the highest level, the challenges pertain to a) creating the right Level of Detail assets which should be used at various "distances" or "switch distances" and b) during the actual game (runtime), selecting the right LOD objects in the right context. If not done right, a player might experience "pixel pop", where the switch from one LOD object to another becomes obvious. In other words, it is desirable to determine which level of detail to use when rendering a mesh, so that the mesh is detailed enough to provide a desired level of visual or perceptual fidelity without being so detailed as to overburden rendering resources.

Conventional LOD object generation is highly manual. However, when starting out with extremely high resolution (high-polygon) assets, doing everything manually is not feasible. At the same time, a purely automated approach does not result in optimized LOD assets every time, and therefore computer graphic artists do need to provide manual input. There are many variables which have to be chosen in order to effectively generate an optimal LOD and, conventionally, those variables have to be considered, and accounted for, manually. Those variables include, for example:

Is an image or scene sufficiently simple so that a fewer number of LOD levels may be used or are more LOD level required given the complexity of the image or scene?

What parameters should be considered while evaluating a LOD reduction target?

When should the LODs be switched (at what switch distance)?

How is the object being used in the game?

How should collisions between objects be managed, keeping in mind that, if one does aggressive reduction, the resulting mesh may not be closed, thereby resulting in a suboptimal collision?

Once the LOD assets have been auto-generated and further optimized manually, during runtime a video game still needs to select the right LOD assets to use at the right time (when the virtual object, relative to a virtual camera position, is close, not-so-close, or far). Conventionally, LOD assets are chosen for rendering based on a fixed switch distance established offline. However, there are many considerations that must be taken in to account while selecting a LOD for rendering during gameplay situations that may be highly dynamic and intensive at least in terms of graphics pipeline processing workload.

Accordingly, there is a need for an automated process of generating LOD assets that also provides artists with an intuitive way to modify and optimize the generated LOD assets manually. There is also a need to determine optimal selection of LOD assets, during runtime, by integrating a plurality of variables into a LOD selection and rendering process. There is further a need for an improved way of generating robust LOD assets and selecting those LOD assets at the right switch distances.

SUMMARY

The following embodiments and aspects thereof are described and illustrated in conjunction with systems, tools and methods, which are meant to be exemplary and illustrative, not limiting in scope. The present application discloses numerous embodiments.

In some embodiments, the present specification discloses a method of generating a plurality of level of detail (LOD) visual assets of an object model, for rendering in a video game, the method comprising: receiving into a LOD management module data indicative of a first LOD visual asset of the object model and a first switch distance associated with the first LOD visual asset; generating, using the LOD management module, a second LOD visual asset by iteratively reducing a polygon mesh complexity of the first LOD visual asset until a maximum geometric deviation of the second LOD visual asset approaches, but does not exceed, a first threshold distance value with respect to the first LOD visual asset; generating, using the LOD management module, a second switch distance at which the first threshold distance value, when represented on a display of a first resolution, comprises a predefined number of pixels; and storing the second LOD in association with the second switch distance if a difference between the first switch distance and second switch distance is greater than a second threshold distance value.

Optionally, if the difference between the first switch distance and the second switch distance is less than or equal to the second threshold distance value, then the second LOD visual asset and the second switch distance are provided as inputs to the LOD management module.

Optionally, the first LOD visual asset and the first switch distance correspond to the object model and an associated predefined switch distance at a beginning of an execution of the method.

Optionally, the first threshold distance value is a maximum distance between at least one vertex in the first LOD visual asset and a closest corresponding point on the second LOD visual as set.

Optionally, the first threshold distance value ranges from 0.001 to 24.0 inches.

Optionally, the predefined number of pixels ranges from 2.0 to 100.00 pixels.

Optionally, when measured using a scale native to the video game, the predefined threshold distance ranges from 10 to 100 feet.

Optionally, steps of the method are repeated until at least one of a first condition or a second condition is satisfied, wherein the first condition corresponds to a size of the second LOD visual asset being determined to be less than or equal to a predefined size, and wherein the second condition corresponds to a maximum number of the plurality of LOD visual assets being generated.

Optionally, the predefined size ranges from 4.0 to 1000.0 inches, and wherein the maximum number of the plurality of LOD visual assets is 6.

Optionally, the method of generating a plurality of level of detail (LOD) visual assets of an object model, for rendering in a video game further comprises generating, using the LOD management module, one or more graphical user interfaces for receiving user input to modify one or more of the generated plurality of LOD visual assets, wherein a portion of the one or more graphical user interfaces prompt for user inputs related to one or more of the following attributes: auto LOD visual asset generation, LOD visual asset count, a LOD visual asset index at which to start generating the plurality of LOD visual assets, distance scale, tri-coverage LOD visual asset threshold, LOD visual asset blink-out, reduction percentage, weight settings to modify a number of triangles, edges and points, importance settings to modify geometry, texture coordinates, normal, material ID, object ID, skinning and vertex color, and settings to modify a maximum deviation, weld threshold, vertex regularization, surface area and/or normal split tolerance.

In some embodiments, the present specification discloses a computer readable non-transitory medium comprising a plurality of executable programmatic instructions wherein, when said plurality of executable programmatic instructions are executed by a processor in a computing device, a process for generating a plurality of level of detail (LOD) of visual assets of an object model is performed for rendering in a video game, wherein the plurality of LOD visual assets comprises at least a first LOD visual asset and a second LOD visual asset, the plurality of executable programmatic instructions comprising: receiving, as input by a LOD management module, data indicative of the first LOD visual asset of the object model and a first switch distance associated with the first LOD visual asset; generating, as a first output by the LOD management module, the second LOD visual asset by iteratively reducing a polygon mesh complexity of the first LOD visual asset, wherein a geometric deviation of the second LOD visual asset reaches a predefined threshold value with respect to the first LOD visual asset; generating, as second output by the LOD management module, a second switch distance at which the predefined threshold value, when projected on a display of a default resolution, comprises a predefined number of pixels; storing, by the LOD management module, the first output in association with the second output if a difference between the first switch distance and the second switch distance is greater than a predefined threshold distance; and generating, by the LOD management module, one or more graphical user interfaces for receiving user input to modify one or more of the plurality of LOD visual assets, wherein a portion of the one or more graphical user interfaces prompt for user inputs related to one or more of a plurality of LOD visual asset related attributes.

Optionally, the computer readable non-transitory medium of claim 11, wherein the plurality of LOD visual asset related attributes include at least one of auto LOD visual asset generation, LOD visual asset count, a LOD visual asset index at which to start generating the plurality of LOD visual assets, distance scale, tri-coverage LOD visual asset threshold, LOD visual asset blink-out, reduction percentage, weight settings to modify a number of triangles, edges and points, importance settings to modify geometry, texture coordinate, normal, material ID, object ID, skinning and vertex color, or settings to modify a maximum deviation, weld threshold, vertex regularization, surface area and/or normal split tolerance.

Optionally, the first visual asset LOD and the first switch distance correspond to said object model and an associated predefined switch distance during a first execution of the process steps.

Optionally, the predefined threshold value is a maximum distance between vertices in the first LOD visual asset and the closest corresponding points on the second LOD visual asset.

Optionally, the predefined threshold value ranges from 0.001 to 24.0 inches.

Optionally, the predefined number of pixels ranges from 2.0 to 100.00 pixels.

Optionally, the predefined threshold distance ranges from 10 to 100 feet when evaluated using a scale native to the video game.

Optionally, the process is repeated until at least one of a first condition or a second condition is reached, wherein the first condition corresponds to a size of the second LOD visual asset being determined to be less than or equal to a predefined size, and wherein the second condition corresponds to a predefined maximum number of the plurality of LOD visual assets being generated.

Optionally, the predefined size ranges from 4.0 to 1000.0 inches, and wherein the predefined maximum number of the plurality of LOD visual assets is 6.

In some embodiments, the present specification is directed towards a method of selecting a level of detail (LOD) visual asset, from a set of pre-generated generated LOD visual assets, for rendering during gameplay in a multiplayer game, said multiplayer game being executed in a multiplayer gaming network comprising at least one game server in data communication with a plurality of client devices located remote from each other, the method comprising: accessing data representative of the set of pre-generated LOD visual assets and associated switch distances; monitoring one or more of a plurality of variables related to the plurality of client devices and/or the gameplay being rendered on the plurality of client devices; determining if one or more of a plurality of corrective factors should be applied to the associated switch distances; and based on the determination, performing a first action or a second action, wherein the first action comprises applying one or more of the plurality of corrective factors to the associated switch distances in order to generate modulated switch distances and selecting a LOD from the set of pre-generated generated LOD visual assets based on one of the modulated switch distances, and wherein the second action comprises selecting a LOD visual asset from the set of pre-generated LOD visual assets based on the associated switch distances corresponding to the selected LOD visual asset.

Optionally, the plurality of variables comprise at least one of a field of view change, a resolution of display screen, a rate of vertex processing throughput, a processor performance or a memory budget.

Optionally, the plurality of corrective factors comprise at least one of a field of view scaling factor, a screen resolution scaling factor, a vertex processing efficiency scaling factor, a processor performance scaling factor or a memory budget-based biasing factor.

Optionally, if a field of view decreases then a switch distance associated with a pre-generated LOD visual asset is increased by said field of view scaling factor and wherein if the field of view increases then the switch distance associated with the pre-generated LOD visual asset is decreased by the field of view scaling factor.

Optionally, the associated switch distances are based on a display having a predefined resolution, and wherein the screen resolution scaling factor is applied to the associated switch distances if a resolution of display on one of said plurality of client devices is above or below the predefined resolution.

Optionally, said vertex processing efficiency scaling factor defines a vertex processing time that, across a plurality of computing platforms, does not vary beyond a range of 0.1 to 30 milliseconds.

Optionally, the processor performance scaling factor is applied to a switch distance associated with a pre-generated LOD visual asset if a processor workload on one of the plurality of client devices causes a maximum processor frame latency to exceed a predefined value.

Optionally, the maximum processor frame latency is 16.67 milliseconds.

Optionally, prior to or during rendering, performing one or more of the following interventions: preventing rendering of a LOD visual asset if a projected size of the LOD visual asset is smaller than a predefined size, switching off procedural vertex motion of a LOD visual asset being rendered at a distance ranging from 256 to 512 inches from a virtual camera, delaying or not allowing a static LOD visual asset to LOD visual asset out earlier than designated by an associated switch distance of the LOD visual asset, and recursively attempting to render a lower complexity LOD visual asset if a higher complexity cannot be rendered due to insufficient streaming bandwidth.

In some embodiments, the present specification discloses a computer readable non-transitory medium comprising a plurality of executable programmatic instructions wherein, when said plurality of executable programmatic instructions are executed by a processor in a computing device, a process for selecting a level of detail (LOD) visual asset, from a set of pre-generated LOD visual assets, is performed to render during gameplay in a multiplayer game, the multiplayer game being executed using a multiplayer gaming network comprising at least one game server in data communication with a plurality of client devices located remote from each other, the plurality of executable programmatic instructions comprising: accessing data representative of the set of pre-generated LOD visual assets and associated switch distances; monitoring one or more of a plurality of variables related to the plurality of client devices and/or the gameplay being rendered on the plurality of client devices; determining if one or more of a plurality of corrective factors should be applied to the associated switch distances; and based on the determination, performing a first action or a second action, wherein the first action comprises applying one or more of the plurality of corrective factors to the associated switch distances in order to generate modulated switch distances and selecting a LOD visual asset from the set of pre-generated LOD visual assets based on one of the modulated switch distances, and wherein the second action comprises selecting a LOD visual asset from the set of pre-generated LOD visual assets based on the associated switch distances corresponding to the selected LOD visual as set.

Optionally, the plurality of variables comprise at least one of a field of view change, a resolution of display screen, a rate of vertex processing throughput, a processor performance or a memory budget.

Optionally, the plurality of corrective factors comprise at least one of a field of view scaling factor, a screen resolution scaling factor, a vertex processing efficiency scaling factor, a processor performance scaling factor or a memory budget-based biasing factor.

Optionally, if a field of view decreases, then a switch distance associated with a pre-generated LOD visual asset is increased by said field of view scaling factor and wherein if the field of view increases then the switch distance associated with the pre-generated LOD visual asset is decreased by the field of view scaling factor.

Optionally, the associated switch distances are based on a display having a predefined resolution, and wherein the screen resolution scaling factor is applied to the associated switch distances if a resolution of a display on one of the plurality of client devices is above or below the predefined resolution.

Optionally, the vertex processing efficiency scaling factor establishes a vertex processing time that, across a plurality of target platforms, does not vary beyond a range of 0.1 to 30 milliseconds.

Optionally, the processor performance scaling factor is applied to a switch distance associated with a pre-generated LOD visual asset if a processor workload on one of said plurality of client devices causes a predefined maximum processor frame latency to exceed.

Optionally, said predefined maximum processor frame latency is 16.67 milliseconds.

Optionally, the computer readable non-transitory medium further comprises, prior to or during rendering, performing one or more of the following interventions: preventing rendering of a LOD visual asset if a projected size of the LOD visual asset is smaller than a predefined size, switching off procedural vertex motion of a LOD visual asset being rendered at a distance ranging from 256 to 512 inches from a virtual camera, delay or not allow a static LOD visual asset to LOD visual asset out earlier than designated by an associated switch distance of the LOD visual asset, and recursively attempting to render a lower complexity LOD visual asset if a higher complexity cannot be rendered due to insufficient streaming bandwidth.

In some embodiments, the present specification discloses a method for generating a plurality of proxy level of detail (LOD) visual assets for contents of a grid cell of a game map in a multi-player video game, wherein the game map is segmented into a plurality of grid cells, the method comprising: receiving, into a LOD management engine, data indicative of the contents of the grid cell; applying, by the LOD management engine, at least one of a plurality of functions to the data; generating, as first output by the LOD management engine, a base proxy LOD visual asset representative of the data and an associated base proxy switch distance as a result of the applying, wherein the base proxy LOD visual asset is stored in association with the base proxy switch distance; receiving, as input into a LOD management module, the base proxy LOD visual asset and the associated base proxy switch distance; generating, as second output by the LOD management module, a first proxy LOD visual asset by iteratively reducing a polygon mesh complexity of the base proxy LOD visual asset until a maximum geometric deviation of the first proxy LOD visual asset approaches, but does not exceeds, a predefined threshold value with respect to the base proxy LOD visual asset; generating, as third output by the LOD management module, a first proxy switch distance at which the predefined threshold value, when projected on a display of a default resolution, comprises a predefined number of pixels; and storing, by the LOD management module, the second output in association with the third output if a difference between the base proxy switch distance and the first proxy switch distance is greater than a predefined threshold distance.

Optionally, the contents include a plurality of static object models represented by their respective LOD visual assets.

Optionally, the plurality of functions include at least one of remeshing or material baking.

Optionally, if a difference between the base proxy switch distance and the first proxy switch distance is less than or equal to the predefined threshold distance, then the second output and the third output are provided as input to the LOD management module.

Optionally, the predefined threshold value is a maximum distance between vertices in the base proxy LOD visual asset and closest corresponding points on the first proxy LOD visual as set.

Optionally, the predefined threshold value ranges from 0.001 to 24.0 inches.

Optionally, the predefined number of pixels ranges from 2.0 to 100.00 inches.

Optionally, the predefined threshold distance ranges from 10 to 100 feet in a distance scale of the multi-player video game.

Optionally, the steps of receiving input, generating second and third outputs and storing second and third outputs are repeated until at least one of first or second conditions is satisfied, wherein the first condition corresponds to a size of the first proxy LOD visual asset being determined to be less than or equal to a predefined size, and wherein the second condition corresponds to a predefined maximum number of the plurality of proxy LOD visual assets being generated.

Optionally, the predefined size ranges from 4.0 to 1000.0 inches, and wherein a predefined maximum number of the plurality of proxy LOD visual assets is 6.

Optionally, the method for generating a plurality of proxy level of detail (LOD) visual assets for contents of a grid cell of a game map in a multi-player video game, wherein the game map is segmented into a plurality of grid cells, further comprises generating, by the LOD management module, one or more graphical user interfaces for receiving user input to modify one or more of the generated plurality of proxy LOD visual assets, wherein a portion of the one or more graphical user interfaces prompt for user inputs related to one or more of the following attributes: auto LOD visual asset generation, LOD visual asset count, a LOD visual asset index at which to start generating the plurality of LOD visual assets, distance scale, tri-coverage LOD visual asset threshold, LOD visual asset blink-out, reduction percentage, weight settings to modify a number of triangles, edges and points, importance settings to modify geometry, texture coordinate, normal, material ID, object ID, skinning and vertex color, and settings to modify a maximum deviation, weld threshold, vertex regularization, surface area and/or normal split tolerance.

Optionally, the present specification discloses a computer readable non-transitory medium comprising a plurality of executable programmatic instructions wherein, when said plurality of executable programmatic instructions are executed by a processor in a computing device, a process for generating a plurality of proxy level of detail (LOD) visual assets is performed for contents of a grid cell of a game map in a multi-player video game, wherein the game map is segmented into a plurality of grid cells, the plurality of executable programmatic instructions comprising: receiving, into a LOD management engine, data indicative of the contents of the grid cell; applying, by the LOD management engine, at least one of a plurality of functions to said data; generating, as first output by the LOD management engine, a base proxy LOD visual asset representative of said data and an associated base proxy switch distance as a result of said applying, wherein the base proxy LOD visual asset is stored in association with the base proxy switch distance; receiving, as input into a LOD management module, the base proxy LOD visual asset and the associated base proxy switch distance; generating, as second output by the LOD management module, a first proxy LOD visual asset by iteratively reducing a polygon mesh complexity of the base proxy LOD visual asset until a maximum geometric deviation of the first proxy LOD visual asset approaches, but does not exceeds, a predefined threshold value with respect to the base proxy LOD visual asset; generating, as third output by the LOD management module, a first proxy switch distance at which the predefined threshold value, when projected on a display of a default resolution, comprises a predefined number of pixels; and storing, by the LOD management module, the second output in association with the third output if a difference between the base proxy switch distance and the first proxy switch distance is greater than a predefined threshold distance.

Optionally, the contents include a plurality of static object models represented by their respective LOD visual assets.

Optionally, the plurality of functions include at least one of remeshing or material baking.

Optionally, if a difference between the base proxy switch distance and the first proxy switch distance is less than or equal to the predefined threshold distance, then the second output and the third output are not stored and instead provided as input to the LOD management module.

Optionally, the predefined threshold value is a maximum distance between vertices in the base proxy LOD visual asset and closest corresponding points on the first proxy LOD visual as set.

Optionally, the predefined threshold value ranges from 0.001 to 24.0 inches.

Optionally, the predefined number of pixels ranges from 2.0 to 100.00 inches.

Optionally, the predefined threshold distance ranges from 10 to 100 feet in a scale of the multi-player video game.

Optionally, the steps of receiving input, generating second and third outputs and storing second and third outputs are repeated until at least one of first or second conditions is satisfied, wherein the first condition corresponds to a size of the first proxy LOD visual asset being determined to be less than or equal to a predefined size, and wherein the second condition corresponds to a predefined maximum number of the plurality of proxy LOD visual assets being generated.

Optionally, the predefined size ranges from 4.0 to 1000.0 inches, and wherein a predefined maximum number of the plurality of proxy LOD visual assets is 6.

Optionally, the computer readable non-transitory medium comprising a plurality of executable programmatic instructions, wherein the plurality of executable programmatic instructions further comprise generating, by the LOD management module, one or more graphical user interfaces for receiving user input to modify one or more of the generated plurality of proxy LOD visual assets, wherein a portion of the one or more graphical user interfaces prompt for user inputs related to one or more of the following attributes: auto LOD visual asset generation, LOD visual asset count, a LOD visual asset index at which to start generating the plurality of LOD visual assets, distance scale, tri-coverage LOD visual asset threshold, LOD visual asset blink-out, reduction percentage, weight settings to modify a number of triangles, edges and points, importance settings to modify geometry, texture coordinate, normal, material ID, object ID, skinning and vertex color, and settings to modify a maximum deviation, weld threshold, vertex regularization, surface area and/or normal split tolerance.

The aforementioned and other embodiments of the present specification shall be described in greater depth in the drawings and detailed description provided below.

BRIEF DESCRIPTION OF THE DRAWINGS

These and other features and advantages of the present specification will be appreciated, as they become better understood by reference to the following detailed description when considered in connection with the accompanying drawings, wherein.

DETAILED DESCRIPTION

Figure 1:
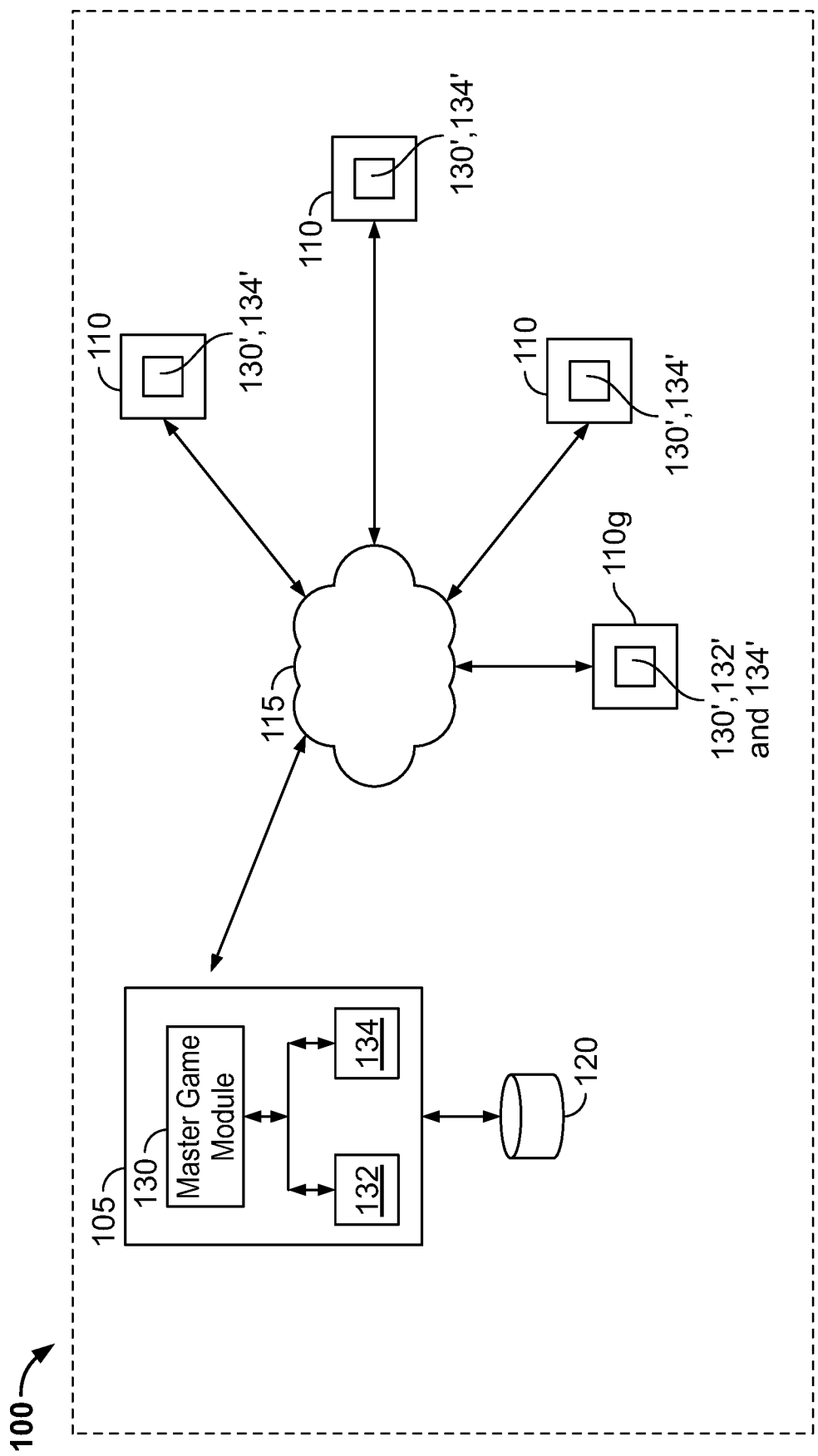
FIG. 1 is a block diagram illustration of a multi-player online gaming system or environment, in accordance with some embodiments of the present specification.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The term "a multi-player online gaming environment" or "massively multiplayer online game" may be construed to mean a specific hardware architecture in which one or more servers electronically communicate with, and concurrently support game interactions with, a plurality of client devices, thereby enabling each of the client devices to simultaneously play in the same instance of the same game. Preferably the plurality of client devices number in the dozens, preferably hundreds, preferably thousands. In one embodiment, the number of concurrently supported client devices ranges from 10 to 5,000,000 and every whole number increment or range therein. Accordingly, a multi-player gaming environment or massively multi-player online game is a computer-related technology, a non-generic technological environment, and should not be abstractly considered a generic method of organizing human activity divorced from its specific technology environment.

In various embodiments, the system includes at least one processor capable of processing programmatic instructions, has a memory capable of storing programmatic instructions, and employs software comprised of a plurality of programmatic instructions for performing the processes described herein. In embodiments, a computer-readable non-transitory medium comprises the plurality of executable programmatic instructions. In one embodiment, the at least one processor is a computing device capable of receiving, executing, and transmitting a plurality of programmatic instructions stored on a volatile or non-volatile computer readable medium.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code enable or cause the CPU of the computing device to perform various functions and processes. In alternate embodiments, hard-wired circuitry may be used in place of, or in combination with, software instructions for implementation of the processes of systems and methods described in this application. Thus, the systems and methods described are not limited to any specific combination of hardware and software.

The term "module", "application" or "engine" used in this disclosure may refer to computer logic utilized to provide a desired functionality, service or operation by programming or controlling a general purpose processor. Stated differently, in some embodiments, a module, application or engine implements a plurality of instructions or programmatic code to cause a general purpose processor to perform one or more functions. In various embodiments, a module, application or engine can be implemented in hardware, firmware, software or any combination thereof. The module, application or engine may be interchangeably used with unit, logic, logical block, component, or circuit, for example. The module, application or engine may be the minimum unit, or part thereof, which performs one or more particular functions.

The term "platform" or "target gaming platform" used in this disclosure may refer to hardware and/or software specifications of a player's client device (which may be a PC or a gaming console, for example). In some embodiments, "platform" may refer to at least GPU (Graphics Processing Unit) specification, CPU specification, display screen resolution, RAM and hard disk space available and a type of operating system.

The term "offline" or "offline process" used in this disclosure refers to one or more programmatic instructions or code that may be implemented or executed while the game is not being played by any player (that is, while the one or more game servers are not rendering a game for playing).

The term "runtime" or "runtime process" used in this disclosure refers to one or more programmatic instructions or code that may be implemented or executed during gameplay (that is, while the one or more game servers are rendering a game for playing).

The term "switch distance" used in this disclosure refers to a distance of an object from an in-game virtual camera at which the game switches from one LOD to another. In some embodiments, for small objects (that is, objects having an on-screen size equal to or below a predefined threshold size) the switch distance refers to a "distance to pivot" that is, the distance of the virtual camera from a point of pivot on a small object (for example, for a small tree the point of pivot may lie at a base of a trunk of the small tree) and is defined as $\vec{D}=\text{length}(\overrightarrow{eye} - \overrightarrow{pos})$. In some embodiments, for large objects (that is, objects having an on-screen size greater than the predefined threshold size) the switch distance refers to a "distance to bounds" that is, the distance of the virtual camera from a point on a geometrical surface bounding a large object (for example, for a large tree the geometrical bounding surface may be that of a sphere encompassing the large tree) and is defined as $\vec{D}=\text{length}(\max(|\overrightarrow{eye} - \overrightarrow{boundsMid}| - \overrightarrow{halfSize}, \vec{0}))$.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise.

Overview

FIG. 1 illustrates an embodiment of a multi-player online gaming or massively multiplayer online gaming system/environment 100 in which the systems and methods of the present specification may be implemented or executed. The system 100 comprises client-server architecture, where one or more game servers 105 are in communication with one or more client devices 110 over a network 115. Players and non-players, such as computer graphics artists or designers, may access the system 100 via the one or more client devices 110. The client devices 110 comprise computing devices such as, but not limited to, personal or desktop computers, laptops, Netbooks, handheld devices such as smartphones, tablets, and PDAs, gaming consoles and/or any other computing platform known to persons of ordinary skill in the art. Although three client devices 110 are illustrated in FIG. 1, any number of client devices 110 can be in communication with the one or more game servers 105 over the network 115.

The one or more game servers 105 can be any computing device having one or more processors and one or more computer-readable storage media such as RAM, hard disk or any other optical or magnetic media. The one or more game servers 105 include a plurality of modules operating to provide or implement a plurality of functional, operational or service-oriented methods of the present specification. In some embodiments, the one or more game servers 105 include or are in communication with at least one database system 120. The database system 120 stores a plurality of game data including data representative of a plurality of LOD (Level of Detail) assets (along with switch distances corresponding to the plurality of LOD assets and LOD-related attributes, characteristics or parameters) associated with at least one game that is served or provided to the client devices 110 over the network 115. In some embodiments, the one or more game servers 105 may be implemented by a cloud of computing platforms operating together as game servers 105.

In accordance with aspects of the present specification, the one or more game servers 105 provide or implement a plurality of modules or engines such as, but not limited to, a master game module 130, a hybrid LOD management module 132, and a rendering module 134. In some embodiments, the one or more client devices 110 are configured to implement or execute one or more of a plurality of client-side modules some of which are same as or similar to the modules of the one or more game servers 105. For example, in some embodiments each of the player client devices 110 executes a client-side game module 130' (also referred to as—client game module 130') that integrates a client-side rendering module 134' (also referred to as—client rendering module 134') while at least one non-player client device 110g executes the client game module 130' that integrates a client-side hybrid LOD management module 132' (also referred to as—client LOD management module 132') and the client rendering module 134'.

In some embodiments, the at least one non-player client device 110g does not include the client LOD management module 132'. Instead, the non-player client device 110g is used by the computer graphics artist or designer to log into the one or more game servers 105 and execute the hybrid LOD management module 132 on the server to auto-generate a plurality of LODs and their associated switch distances, offline. The auto-generated plurality of LODs and their associated switch distances are stored in the at least one database 120.

In some embodiments, the one or more game servers 105 do not implement the hybrid LOD management module 132. Instead, the hybrid LOD management module 132 is implemented on the non-player client device 110g wherein the computer graphics artist or designer execute the hybrid LOD management module 132 on the server to auto-generate a plurality of LODs and their associated switch distances, offline. The auto-generated plurality of LODs and their associated switch distances are then uploaded, via the network 115, and stored in the at least one database 120.

While various aspects of the present specification are being described with reference to functionalities or programming distributed across multiple modules or engines 132 and 134, it should be appreciated that, in some embodiments, some or all of the functionalities or programming associated with these modules or engines may be integrated within fewer modules or in a single module—such as, for example, in the master game module 130 itself on the server side and in the client gaming module 130' on the client side.

In embodiments, the master game module 130 is configured to execute an instance of an online game to facilitate interaction of the players with the game. In embodiments, the instance of the game executed may be synchronous, asynchronous, and/or semi-synchronous. The master game module 130 controls aspects of the game for all players and receives and processes each player's input in the game. In other words, the master game module 130 hosts the online game for all players, receives game data from the client devices 110 and transmits updates to all client devices 110 based on the received game data so that the game, on each of the client devices 110, represents the most updated or current status with reference to interactions of all players with the game. Thus, the master game module 130 transmits game data over the network 115 to the client devices 110 for use and rendering by the game module 130' to provide local versions and current status of the game to the players.

On the client-side, each of the one or more player client devices 110 implements the game module 130' that operates as a gaming application to provide a player with an interface between the player and the game. The game module 130' generates the interface to render a virtual environment, virtual space or virtual world associated with the game and enables the player to interact in the virtual environment to perform a plurality of game and other tasks and objectives. The game module 130' accesses game data received from the game server 105 to provide an accurate representation of the game to the player. The game module 130' captures and processes player inputs and interactions within the virtual world or environment and provides updates to the game server 110 over the network 115.

In embodiments, the game module 130' (for each of the one or more player client devices 110) also integrates the client rendering module 134' that, in data communication with the server-side rendering module 134, performs a plurality of tasks (during runtime or execution of gameplay) such as: a) determining which representation, version or LOD, out of a set, group or chain of LOD assets, to render for a given gameplay view or scene, b) assessing a player's client device configurations and platform specifications such as, but not limited to, display screen resolution, GPU capabilities and memory availability, c) monitoring network (for example, Internet) connectivity or streaming bandwidth fluctuations, GPU workload and performance parameters (such as, for example, frame latency), memory usage and the player's field of view (FOV) changes, d) dynamically applying one or more of a plurality of corrective factors to offline authored switch distances of various LOD assets, wherein the one or more of a plurality of corrective factors include factors such as FOV scaling, screen resolution scaling, vertex processing efficiency scaling, general processing unit (GPU) performance scaling and memory budget-based biasing, and e) implementing a plurality of case, context or scenario based interventions such as rejecting objects smaller than a predefined threshold, switching off procedural vertex motion or animation for more distant LODs, delaying or not allowing LODs corresponding to a 'static' object to switch to lower complexity LODs earlier than designated by the offline authored switch distances of the respective LODs, implementing LOD fallback plans, and rendering proxy LODs, when needed.

In embodiments, the at least one client device 110g is configured as a non-player computing device to enable a graphics artist or designer to interact with the one or more game servers 105. In embodiments, the at least one client device 110g also implements the client game module 130' that, in some embodiments, further integrates the client LOD management module 132' and the client rendering module 134'. In accordance with some aspects of the present specification, an offline execution of the client LOD management module 132', in data communication with the server-side LOD management module 132, enables auto-generation of one or more chains of LOD assets with associated offline authored switch distances. The offline execution of the client LOD management module 132', in data communication with the server-side LOD management module 132, further results in generating one or more GUIs (graphical user interfaces) to enable the graphics designer or artist to optimize and modify one or more of the auto-generated chains of LOD assets and associated offline switch distances on the basis of at least one of a plurality of LOD-related attributes, characteristics or parameters.

The database system 120 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database system 120 may comprise one or more such databases that reside in one or more physical devices and in one or more physical locations.

LOD Management Module

During an offline process, a hybrid LOD management module or engine 132 implements a plurality of instructions or programmatic code to a) enable automated generation of a plurality of representations or versions of an object model (that corresponds to a most detailed, complex or highest resolution object model). In embodiments, each of the plurality of representations or versions of the object model has a different level of detail (LOD) ranging from a most detailed or complex LOD representation to a least complex (or simplest) LOD representation, and b) generate one or more GUIs (graphical user interfaces) to enable a graphics designer or artist to modify one or more of the plurality of representations or versions of the object model on the basis of at least one of a plurality of LOD-related attributes, characteristics or parameters.

In embodiments, a representation, version or LOD of an object model is described using a plurality of geometric primitives such as, for example, triangles, quadrilaterals, polygons or non-uniform rational basis spline (NURBS). In embodiments, a base model is associated with a highest number of geometric primitives and therefore a highest complexity or resolution.

Figure 2A:
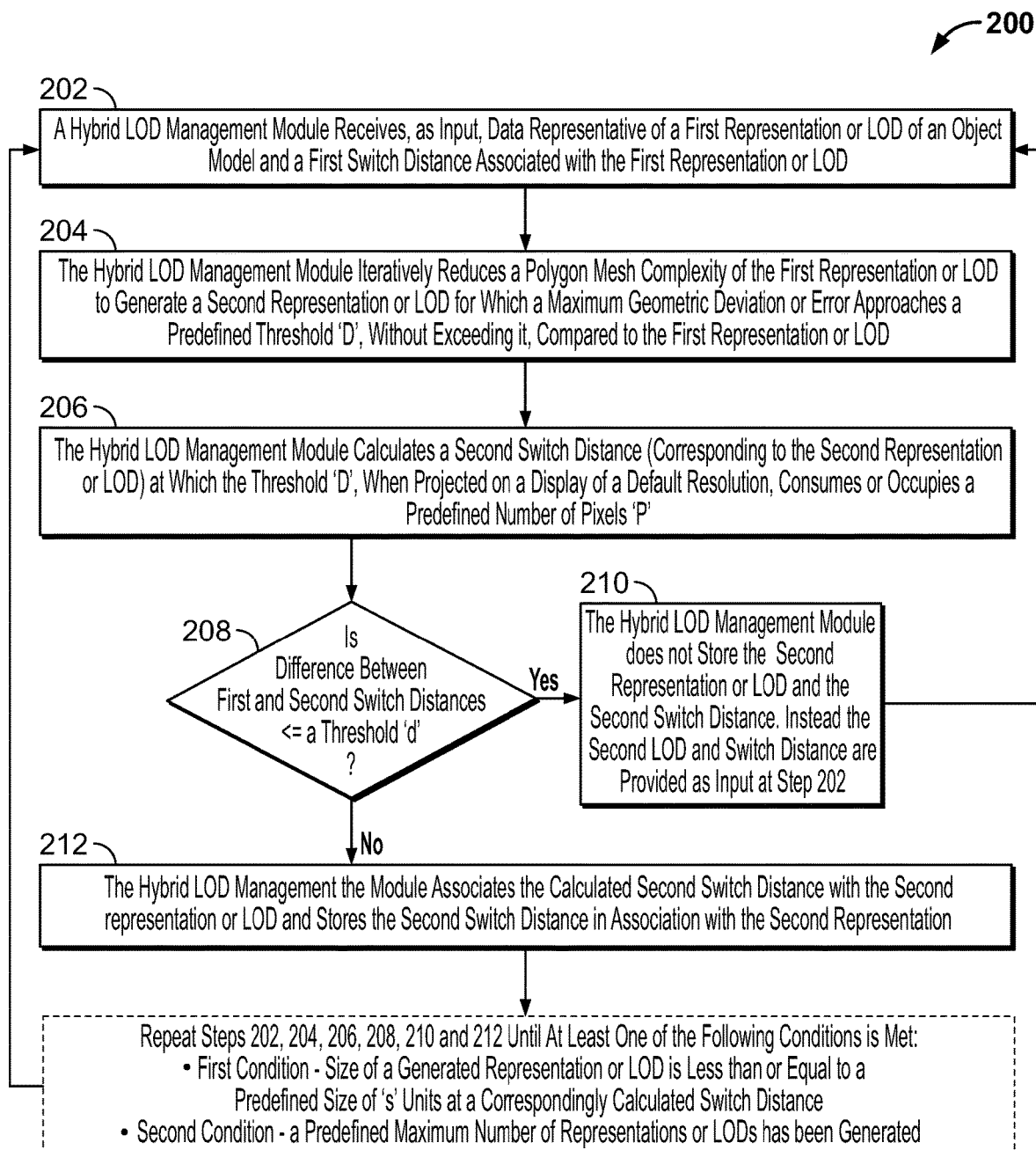
FIG. 2A is a flowchart of a plurality of exemplary steps of a method of generating a plurality of geometric representations, versions or LODs of an object model, in accordance with some embodiments of the present specification.

FIG. 2A is a flowchart of a plurality of exemplary steps of a method 200 of generating a plurality of geometric representations, versions or LODs of an object model, in accordance with some embodiments of the present specification. In embodiments, the method 200 is implemented, offline, by the hybrid LOD management module or engine 132. In various embodiments, the plurality of representations or LODs is described using a collection of geometric primitives such as, but not limited to, polygons or non-uniform rational basis spline (NURBS).

At step 202, the module 132 receives, as input, data indicative of a first representation or LOD of an object model and a first switch distance associated with the first representation or LOD. In some embodiments, the first representation or LOD and the associated first switch distance are stored in the at least one database 120 from which this data is accessible to the module 132.

At step 204, the module 132 iteratively reduces the polygon mesh complexity (that is, reduce the number of polygons) of the first representation or LOD to generate a second representation or LOD for which a maximum geometric deviation or error approaches a predefined threshold 'D', without exceeding it, compared to the first representation or LOD. Accordingly, in some embodiments, each vertex in the first representation diverges or deviates from a closest corresponding point on the second representation of the object by no more than 'D' units. Therefore, in some embodiments, the predefined threshold 'D' is a maximum distance between vertices in the first representation and the closest corresponding points on the second representation of the object. That is, the predefined threshold 'D' is a maximum distance between any point on the surface of the first representation and any closest corresponding point on the surface of the second representation of the object. In embodiments, the second representation corresponds to a less complex or simplified version of the object model compared to the first representation.

Figure 3A:
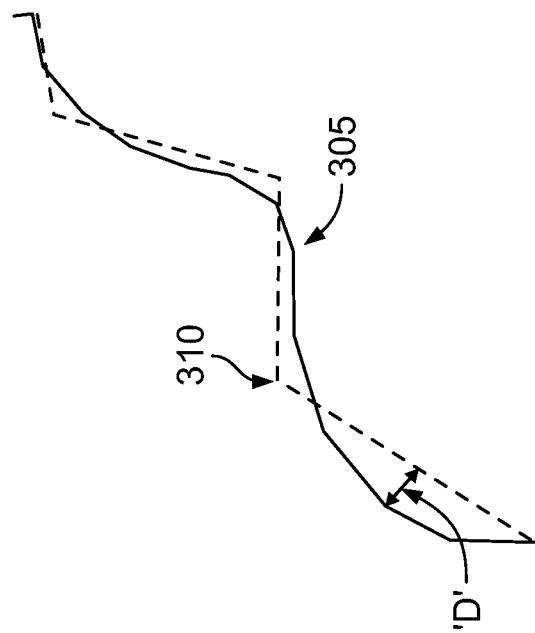
FIG. 3A illustrates a step of using geometric deviation or error as a criterion for polygon mesh complexity reduction, in accordance with some embodiments of the present specification.
Figure 3A:
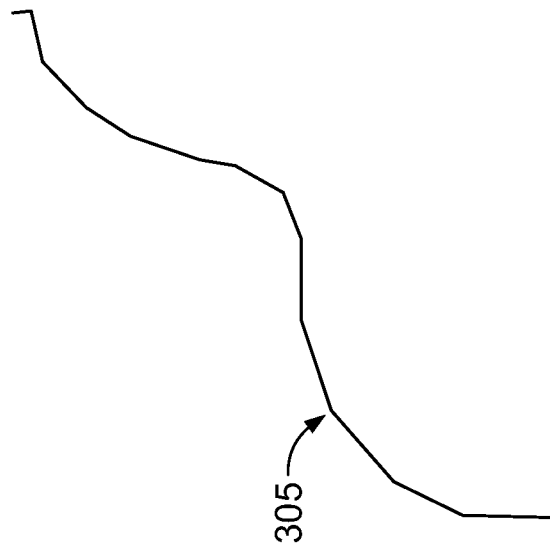

As shown in FIG. 3A, a polygon mesh 305 corresponds to a first representation or LOD mesh which is iteratively reduced to generate a second representation or LOD mesh 310 having a maximum geometric deviation or error of 'D' units.

In embodiments, the value of the predefined threshold 'D' is manually customizable and may vary at least across different types of object models such as those corresponding to, for example, a hero object, simple props, and peripheral objects. In some embodiments, the predefined threshold 'D' ranges from 0.001 to 24.0 inches depending upon the type of object model. In alternate embodiments, the aforementioned range for the predefined threshold 'D' may be expressed in other units such as, for example, millimeters, centimeters and feet.

It should be appreciated that the polygon mesh simplification is directed towards reducing the complexity of a mesh (number of polygons) while optimizing visual fidelity. In various embodiments, polygon mesh simplification is achieved using geometric reduction methods known to persons of ordinary skill in the art such as, for example, edge collapse, vertex pair collapse, triangle collapse, cell collapse, vertex removal, polygon merging, volumetric processing, and simplification envelopes.

Figure 3B:
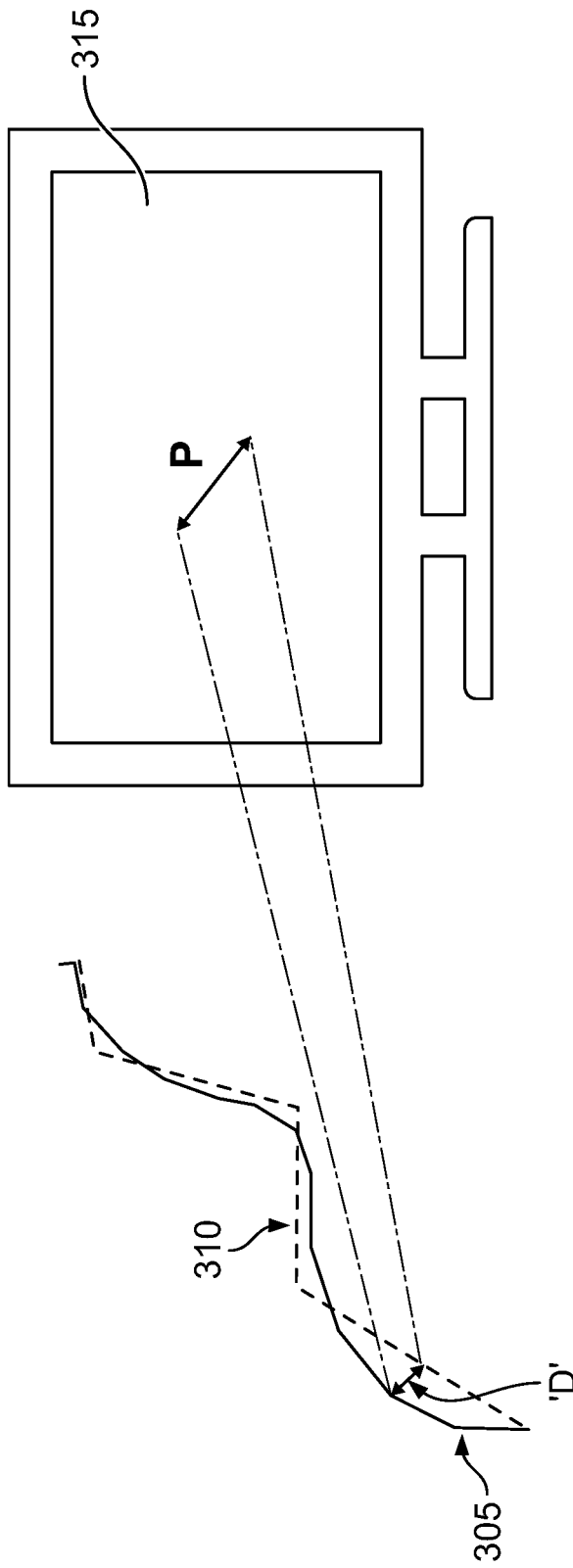
FIG. 3B illustrates another step of using geometric deviation or error as a criterion for polygon mesh complexity reduction, in accordance with some embodiments of the present specification.

At step 206, the module 132 calculates a second switch distance (corresponding to the second representation or LOD) at which the threshold 'D', when projected on a display of a default resolution, consumes or occupies a predefined number of pixels 'P'. As shown in FIG. 3B, the maximum geometric deviation or error of 'D' units, between the first and second LOD meshes 305, 310 is projected on a display screen 315 of a default resolution.

In some embodiments, the default resolution corresponds to a 1080p display. In some embodiments, the predefined number of pixels 'P' ranges from 2.0 to 100.00 pixels for a 1080p display. In some embodiments, the module 132 calculates the second switch distance by translating the geometric deviation or error 'D' to a pixel distance on-screen by projecting a sphere of a certain diameter onto a screen of the default resolution and determining a size of the resultant circle. Accordingly, in some embodiments, the second switch distance (switchDist) is calculated using the following equations:

$P = \text{modelRadius} * 2.0/D$ $\text{screenRatio} = P/\text{screenSize}$ $\text{nearClipDist} = 1.0/\tan(\text{fovRadians}/2.0)$ $\text{bsphereAngle} = \tan^{-1}(\text{screenRatio}/\text{nearClipDist})$ $\text{switchDist} = \text{modelRadius}/\sin(\text{bsphereAngle})$ where, P is a predefined number of pixels, D is a predefined geometric deviation; modelRadius (in inches) is the smallest 3D sphere that tightly encompasses a given model; screenRatio is a different representation of pixelSize 'P', normalized against 'screenSize'; screenSize is a fixed size of a reference display screen (and that in some embodiments is 1080.0 pixels); nearClipDist is a distance to the near clipping plane of a normalized (unit) view frustum defined by "fovRadians"; fovRadians is a field of view of a reference display screen in radians (which, in some embodiments, is 1.13446401 (65.0 degrees)); and bsphereAngle is an angle, in radians, of a given model's bounding sphere (defined by its center and "modelRadius") projected on the reference display.

At step 208, the module 132 compares the second switch distance with the first switch distance to determine if the first and second switch distances are too close to each other. Stated differently, if a difference between the first and second switch distances is determined to be less than or equal to a predefined threshold then, at step 210, the module 132 does not store the second representation or LOD in the at least one database 120. That is, if the difference between the first and second switch distances is not greater than the predefined threshold then the two switch distances are considered to be too close to each other. Subsequently, the flow control moves back to step 202 with the second representation or LOD and the second switch distance being received as input by the module 132 in order to generate a subsequent LOD and corresponding switch distance.

However, if the difference between the first and second switch distances is determined to be greater than the predefined threshold then, at step 212, the module 132 associates the calculated second switch distance with the second representation or LOD and stores the second switch distance in association with the second representation in the at least one database 120. In some embodiments, the predefined threshold 'd' ranges from 10 to 100 feet for a 1080p display.

It should be appreciated that the comparison of two subsequent switch distances, such as the first and second switch distances, is directed towards preventing wastage of memory space (for storing various object model representations or LODs) and LOD assets. As an illustration, if there are two LODs that switch within, say, 1 inch of each other, it indicates that one of the two LODs will hardly ever be seen during runtime or gameplay. Therefore, an objective is to ensure that any two LODs have switch distances that are at least some significant distance apart so that each of the two LODs would be actually seen during gameplay (otherwise these two LODs would just take up memory space). In some embodiments, the predefined threshold is at least equal to the sum of all previous values of 'd'. For example, when determining 'd' for $LOD_3$, it will at least be equal to a first 'd' for $LOD_1$ (i.e. the maximum geometric deviation between $LOD_0$ and $LOD_1$) plus a second 'd' for $LOD_2$ (i.e. the maximum geometric deviation between $LOD_1$ and $LOD_2$).

During a first pass of the steps 202, 204, 206, 208, 210 and 212, in some embodiments, the first representation or LOD corresponds to a full object model. The full object model is associated with a highest number of geometric primitives and therefore a highest complexity or resolution. Accordingly, the first switch distance, in some embodiments, corresponds to a predefined switch distance associated with the full object model. Thus, in the first pass of the steps 202, 204, 206, 208, 210 and 212, the module 132 iteratively reduces the polygon mesh complexity of the first representation or LOD (the full object model) to generate the second representation or LOD (the base representation or $LOD_0$) for which a geometric deviation or error reaches the predefined threshold 'D' compared to the first representation or LOD. Thereafter, the module 132 calculates a second switch distance (corresponding to the second representation or LOD) at which the threshold 'D', when projected on the display of the default resolution, consumes or occupies the predefined number of pixels 'P'.

Steps 202, 204, 206, 208, 210 and 212 are repeated by the module 132 to generate subsequent representations or LODs. For example, to generate a third representation or LOD, the previously generated second representation is received as input in the module 132, at a repeat of step 202. At a repeat of step 204, the module 132 iteratively reduces the polygon mesh complexity of the second representation or LOD to generate the third representation or LOD for which a geometric deviation or error reaches the predefined threshold 'D' compared to the second representation or LOD. Thereafter, at a repeat of step 206, the module 132 calculates a third switch distance (corresponding to the third representation or LOD) at which the threshold 'D', when projected on the display of the default resolution, consumes or occupies the predefined number of pixels 'P'. Now, at step 208, the model 132 compares the second switch distance with the third switch distance and, based on the comparison, either rejects the third representation, at a repeat of step 210, or stores the third switch distance in association with the third representation in the at least one database 120, at a repeat of step 212.

Similarly, the third representation or LOD is taken as input by the module 132 (at another repeat of step 202) in order to generate a fourth representation or LOD, and so on. Thus, the module 132 iterates through the steps 202, 204, 206, 208, 210 and 212 to generate a plurality of representations or LODs of the object model such that a generated representation or LOD is characterized by increasing level of simplicity or reduced number of geometric primitives compared to an immediate prior generated representation or LOD.

In some embodiments, the module 132 repeats the steps 202, 204, 206, 208, 210 and 212 until a first condition is met, wherein the first condition corresponds to a size of a generated representation or LOD being determined to be less than or equal to a predefined size of 's' inches at a correspondingly calculated switch distance. That is, the module 132 stops generating further representations or LODs of the object model when the size of a generated representation approaches the predefined size 's' indicative of the size of the generated representation being too small. In some embodiments, the predefined size 's' ranges from 4.0 to 1000.0 inches on a 1080p display. In alternate embodiments, the aforementioned range for the predefined size 's' may be expressed in other units such as, for example, millimeters, centimeters and feet.

In some embodiments, the module 132 repeats the steps 202, 204, 206, 208, 210 and 212 until a second condition is met, wherein the second condition corresponds to a predefined maximum number of representations or LODs being generated. In some embodiments, the predefined maximum number of representations or LODs is 5. In some embodiments, when including the base representation or LOD, the predefined maximum number of representations or LODs is 6.

In some embodiments, the module 132 repeats the steps 202, 204, 206, 208, 210 and 212 until at least one of the first or second condition is met.

LOD Optimization Process

In embodiments, as part of an offline process, a computer graphics artist or designer exports an object model (represented by plurality of geometric primitives) from a Digital Content Creation (DCC) application such as, for example, 3ds Max or Maya. The exported object model is provided as an input to the hybrid LOD management module or engine 132 that executes or implements the method 200 of FIG. 2A to automatically generate a plurality of geometric representations, versions or LODs of the object model along with their associated switch distances. Consequently, by executing the method 200, the module 132 auto-generates a plurality of LODs (or LOD assets) of the object model.

In accordance with aspects of the present specification, the module 132 enables the computer graphics artist or designer to further optimize the auto generated plurality of geometric representations, versions or LODs, if required.

Figure 2B:
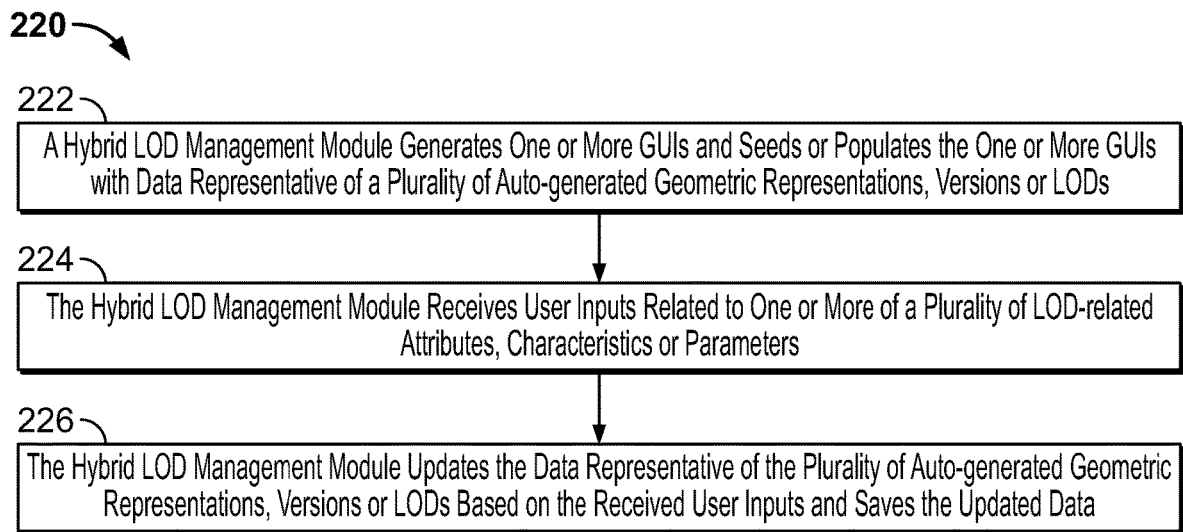
FIG. 2B is a flowchart of a plurality of exemplary steps of a method of enabling optimization and modulation of one or more of a plurality of LOD-related attributes, characteristics or parameters of the plurality of geometric representations, versions or LODs generated using the method of FIG. 2A, in accordance with some embodiments of the present specification.

FIG. 2B is a flowchart of a plurality of exemplary steps of a method 220 of enabling further optimization and modulation of one or more of a plurality of LOD-related attributes, characteristics or parameters of a plurality of auto-generated geometric representations, versions or LODs of an object model, in accordance with some embodiments of the present specification.

Accordingly, in some embodiments, at step 222, the module 132 generates one or more GUIs (Graphical User Interfaces) and seeds or populates the one or more GUIs with data representative of the plurality of auto-generated geometric representations, versions or LODs (that were generated by the module 132 using the method 200 of FIG. 2A). The data is accessed from the at least one database 120. In various embodiments, the data comprises a plurality of LOD-related attributes, characteristics or parameters such as, but not limited to, the number of vertices, percentage reduction or decimation, and the switch distance corresponding to each LOD.

The module 132 generates the one or more GUIs to prompt the computer graphics artist or designer for inputs related to modulation of one or more of the plurality of LOD-related attributes, characteristics or parameters in order to modify one or more of the plurality of auto-generated geometric representations, versions or LODs.

Figure 4A:
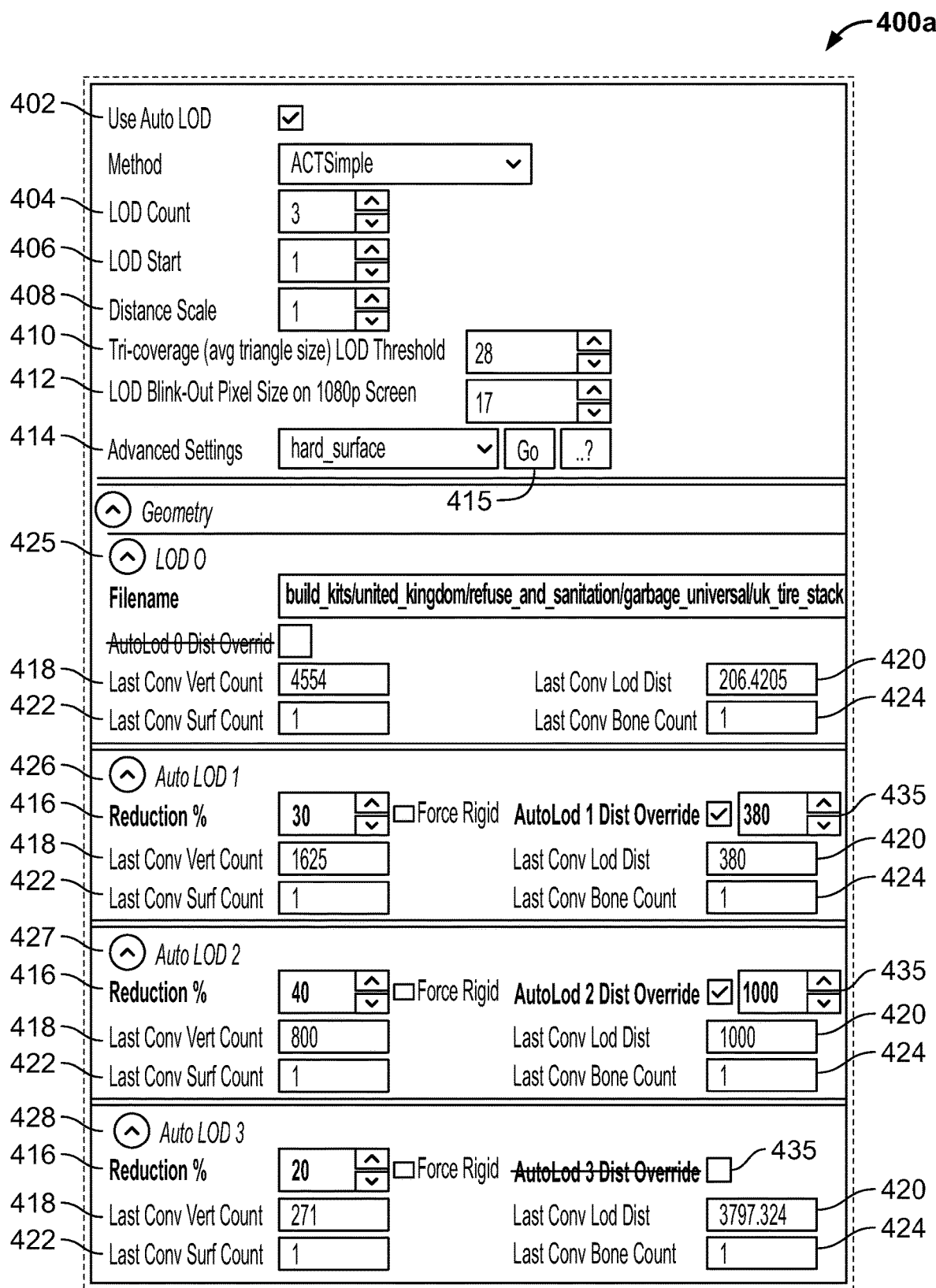
FIG. 4A shows a first exemplary GUI to enable a computer graphics artist or designer to modify one or more of a plurality of auto-generated geometric representations, versions or LODs of an object model, in accordance with some embodiments of the specification.
Figure 4B:
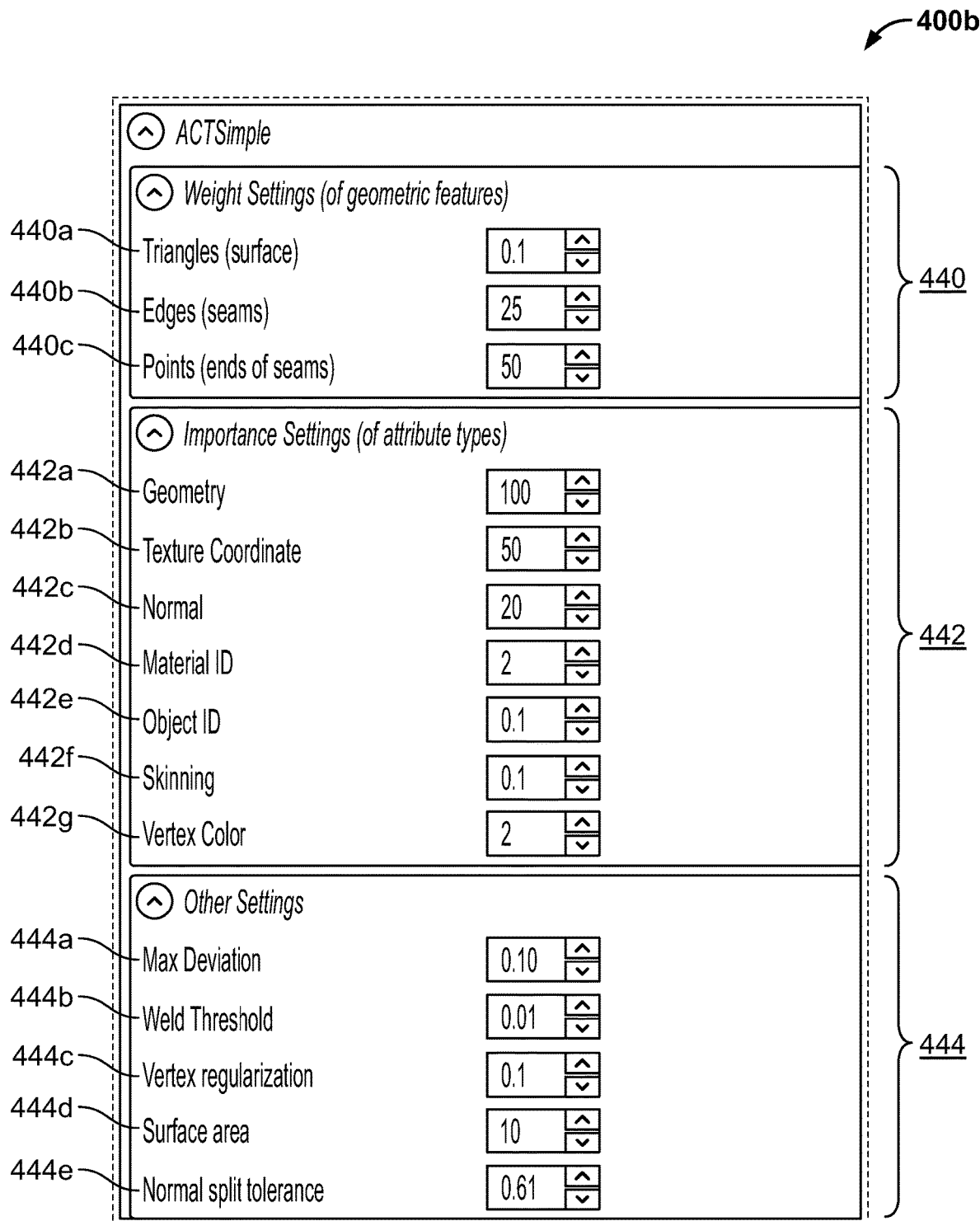
FIG. 4B shows a second exemplary GUI to enable the computer graphics artist or designer to modify one or more of the plurality of auto-generated geometric representations, versions or LODs, in accordance with some embodiments of the specification.

FIGS. 4A and 4B show exemplary first and second GUIs to enable a computer graphics artist or designer to modify one or more of the plurality of auto-generated geometric representations, versions or LODs of an object model, in accordance with some embodiments of the specification. As exemplary naming convention, $LOD_0$ refers to a base geometric representation of the object model (the object model being associated with a highest number of geometric primitives or polygons and therefore a highest complexity, detailing or resolution). Subsequent, lower polygon representations, versions or LODs of the base representation are referred to as $LOD_1$, $LOD_2$, $LOD_3$, and so on. In embodiments, the number of geometric primitives or polygons and therefore the complexity, detailing or resolution progressively reduces from $LOD_1$ to $LOD_2$ to $LOD_3$ and so on such that a last LOD (in a chain, collection, group or set of LOD assets) is characterized by a least number of polygons and therefore the lowest complexity, detailing or resolution.

Referring now to FIG. 4A, the first GUI 400a illustrates a first plurality of LOD-related attributes, characteristics or parameters:

Auto LOD 402: an enabled Auto LOD 402 attribute indicates that the module 132 has been tasked to execute or has already executed a background process (the method 200 of FIG. 2A) to auto-generate a plurality of geometric representations, versions or LODs of the object model—that is a plurality of lower polygon versions of the base representation.

LOD count 404: this parameter indicates a number of LODs that the module 132 has been tasked to generate or has already generated. As an exemplary illustration, a LOD count of 3 indicates that the module 132 has auto-generated three LODs or versions ($LOD_1$, $LOD_2$, $LOD_3$) of the base representation (LOD)). In embodiments, the graphics artist may optimize the auto-generated LOD assets in terms of the number of LODs desired. For example, while the module 132 may have auto-generated three LODs of the base LOD0, the artist may feel that the base LOD0 being a simple model with low vertices counts may actually require fewer than three subsequent representations, versions or LODs. Alternatively, the artist may feel that the base LOD0 being a complex model with high vertices counts may actually require more than three subsequent representations, versions or LODs. Consequently, the graphics artist may tweak the LOD count 404 to override the number of LODs (three in this case scenario) auto-generated by the module 132. Alternatively, the graphics artist may pre-fill a desired LOD count 404 before tasking the module 132 to implement the method 200 of FIG. 2A and generate only the desired number of LODs.

LOD start 406: this parameter specifies a LOD index (indicated by the suffix of a LOD for example, $LOD_1$, $LOD_2$, $LOD_3$, $LOD_4$) at which the graphics artist may task the module 132 to start generating the number of LODs (as also specified by the LOD count 404 parameter). Alternatively, this parameter indicates the LOD index from which the module 132 generated the LODs. For example, as shown in the first GUI 400a, the LOD start 406 parameter is 1 indicating that the module 132 needs to either start generating LODs from $LOD_1$ onwards or that the module 132 has generated LODs from $LOD_1$ onwards.

Distance scale 408: this parameter indicates how soon/ early LODs may switch. In some embodiments, a default value for the parameter is 1. A value lower than 1 causes all LODs, in a chain of LOD assets, to switch sooner while a value higher than 1 causes switching of the LODs to be proportionately delayed.

Tri-coverage LOD threshold 410: this parameter enables modulation of how soon/early all LODs may switch. In some embodiments, a default value for the parameter is 10 indicating that the LODs should be switched when an average triangle takes up 10 pixels on a 1080p screen. If the graphics artist observes that the LODs are switching too soon, he may decrease the value of this parameter and vice versa.

It should be appreciated that both distance scale 408 and tri-coverage LOD threshold 410 are used to modulate the distance used for LOD switching, albeit with different metrics. Scaling distance directly, using the distance scale 408, is more intuitive (for example, a value of "2" means double the distance) but disregards runtime performance or visual implications. Scaling via tri coverage 410 has more deterministic runtime visual and performance implications, but since that final scale value is highly dependent on source model topology, its results are not intuitive.

LOD blink-out (or cull-out) pixel size 412: this parameter indicates a pixel size on a 1080p screen before a last LOD of an object model is removed (blinks out) from the screen. In some embodiments, a default value for the parameter is 20. Depending on how the object model's last LOD will be seen in a game, the graphics artist may desire to keep the last LOD longer and may therefore accordingly modulate this parameter.

Advanced settings 414: the graphics artist may choose one of a plurality of LOD settings here. For example, in some embodiments, a setting of 'hard surface' is chosen for any hard surface where at a distance the artist needs an edge or corner of a LOD to retain looking hard. In some embodiments, a setting of 'Environment Organic' is chosen for soft/round surfaces such as bags, characters. This setting welds vertices and does not split a vertex thereby retaining a soft smoothing group across the LODs (except for a last LOD).

Reduction % 416: this parameter indicates the percentage of the number of geometric primitives targeted for a LOD, during reduction, with reference to an immediately previous LOD. For example, a value of 75% means reduction is performed until a current LOD contains 75% of the primitives that were in its reference LOD representation. This means smaller values of the parameter 416 will remove many more primitives (for example, a value of 5% will have a 95% reduction in primitives from its source). In some embodiments, a default value is 50% for each auto-generated LOD. As shown in the GUI 400a, the reduction % for $LOD_1$ 426 is 30% with reference to the previous $LOD_0$ 425, the reduction % for $LOD_2$ 427 is 40% with reference to the previous $LOD_1$ 426 and the reduction % for $LOD_3$ 428 is 20% with reference to the previous $LOD_2$ 427. In embodiments, a value of this parameter is customizable by the graphics artist for each of the LODs.

Also, each LOD (425, 426, 427 and 428) has a group of associated parameters such as vertices count 418—indicative of the number of vertices in a polygon mesh of a LOD, LOD distance 420—indicative of a distance at which an associated LOD is switched, surfaces count 422—indicative of a number of surface in a polygon mesh of a LOD and bone count 424. Persons of ordinary skill in the art would appreciate that all models have at least one bone. Articulated models, such as animated characters, can have a plurality of bones and upwards of hundreds. The more bones in a given LOD, the more expensive it is to animate and render in-game. As such, it is prudent to reduce the number of bones required to represent a given model LOD. A surface is the smallest representation of model geometry understood by a renderer, typically representing all triangles shared by a single material/bone combination. Any model contains one or more surfaces. As such it is also prudent to minimize their counts with subsequent model LOD's as well.

As can be seen in the first GUI 400a, the vertices count 418 reduces from $LOD_0$ 425 to $LOD_1$ 427 to $LOD_2$ 429 to $LOD_3$ 430 in accordance with the reduction % 416 with reference to the base $LOD_0$ 425. A LOD distance override parameter 435 when selected/checked enables the graphic artist to modulate the auto-generated switch distance associated with a LOD. For example, as shown in the first GUI 400a, the graphic artist has selected the distance override parameter 435 for $LOD_1$ and $LOD_2$ and modified the corresponding switch distances, auto-generated by the module 132, to the values of 380 and 1000 respectively. The auto-generated switch distance for $LOD_3$ has been retained by the graphics artist.

The second GUI 400b of FIG. 4B is generated when the graphics artist clicks the 'go' button 415 of the advanced settings 414. Referring now to FIG. 4B, the second GUI 400b illustrates a second plurality of LOD-related attributes, characteristics or parameters (that affect all LODs of all models that reference their corresponding settings simultaneously):

Weight settings 440—using the weight settings 440 the graphics artist may modify geometric features such as the number of triangles 440a, edges (or seams) 440b and points (ends of seams) 440c.

Importance settings 442—using the importance settings 442 the graphics artist may modify attribute types such as the geometry 442a, texture coordinate 442b, normal 442c, material ID 442d, object ID 442e, skinning 442f and vertex color 442g. The significance of each of these attribute types is as follows, in embodiments:

Geometry 442a: relative importance of silhouette preservation. This is an importance of the positions of the mesh in 3D space, whereas all other significances are of the attribute types.

Texture coordinate 442b: relative importance of texture coordinates preservation to all other attributes.

Normal b442c: relative importance of vertex normal preservation to all other attributes.

Material ID 442d: relative importance of material ID preservation to all other attributes.

Object ID 442e: relative importance of object ID preservation to all other attributes.

Skinning 442f: relative importance of vertex skinning weights preservation to all other attributes.

Color 442g: relative importance of vertex color preservation to all other attributes.

These values are used to help the mesh reduction algorithm or method (such as the method 200 of FIG. 2A) determine or choose which input model features are more important than others. This way the algorithm or method can make more informed decisions as part of its simplification process. Modifying or tweaking them up/down will impact all models that share those settings simultaneously.

Other settings 444—using these settings 444 the graphics artist may modify parameters such as the maximum deviation 444a, weld threshold 444b, vertex regularization 444c, surface area 444d and normal split tolerance 444e. The significance of each of these parameters is as follows:

Maximum deviation 444a: if specified, this value overrides the maximum deviation configured in the method 200 of FIG. 2A for all models that use those particular settings.

Weld threshold 444b: the welding distance below which vertices will be welded, in game units.

Vertex regularization 444c: a factor used to determine how uniformly triangles in the input mesh are tessellated. Higher values yield more even spatial distribution of vertices, but with possible decreases in silhouette preservation.

Surface area 444d: the importance factor of maintaining surface area across a model during reduction.

Normal Split Tolerances 444e: if a squared distance between normals a and $b=(ax-bx)^2+(ay-by)^2+(az-bz)^2$ is greater than this threshold, a seam will be added to allow discontinuous change. Zero disables splitting (special check is done for zero, as otherwise it would mean always split). Small non-zero values split a lot, and $4=(1-(-1))^2$ is max value that two normals can have from pointing opposite directions and would also effectively disable splitting. Normal splitting is a required step of mesh reduction.

These values are also used to help the mesh reduction algorithm or method (such as the method 200 of FIG. 2A) to take more informed decisions about what aspects of the input model are most important. Tweaking them up/down will impact all models that share those settings simultaneously.

Referring back to FIG. 2B, at step 224, the module 132 receives inputs related to one or more of the plurality of LOD-related attributes, characteristics or parameters. At step 226, the module 132 updates the data representative of the plurality of auto-generated geometric representations, versions or LODs based on the received inputs and saves the updated data in the at least one database 120.

In some embodiments, the module 132 also generates and provides the graphic artist with one or more visual, intuitive guidance tools to enable the artist to gauge the runtime efficiency (such as in terms of, for example, overall memory usage and GPU workload) of a chain of LOD assets as a result of the graphic artist making modifications to the plurality of LOD-related attributes, characteristics or parameters (such as, but not limited to, those illustrated in the first and second GUIs 400a, 400b) of the auto-generated plurality of LODs.

Figure 5A:
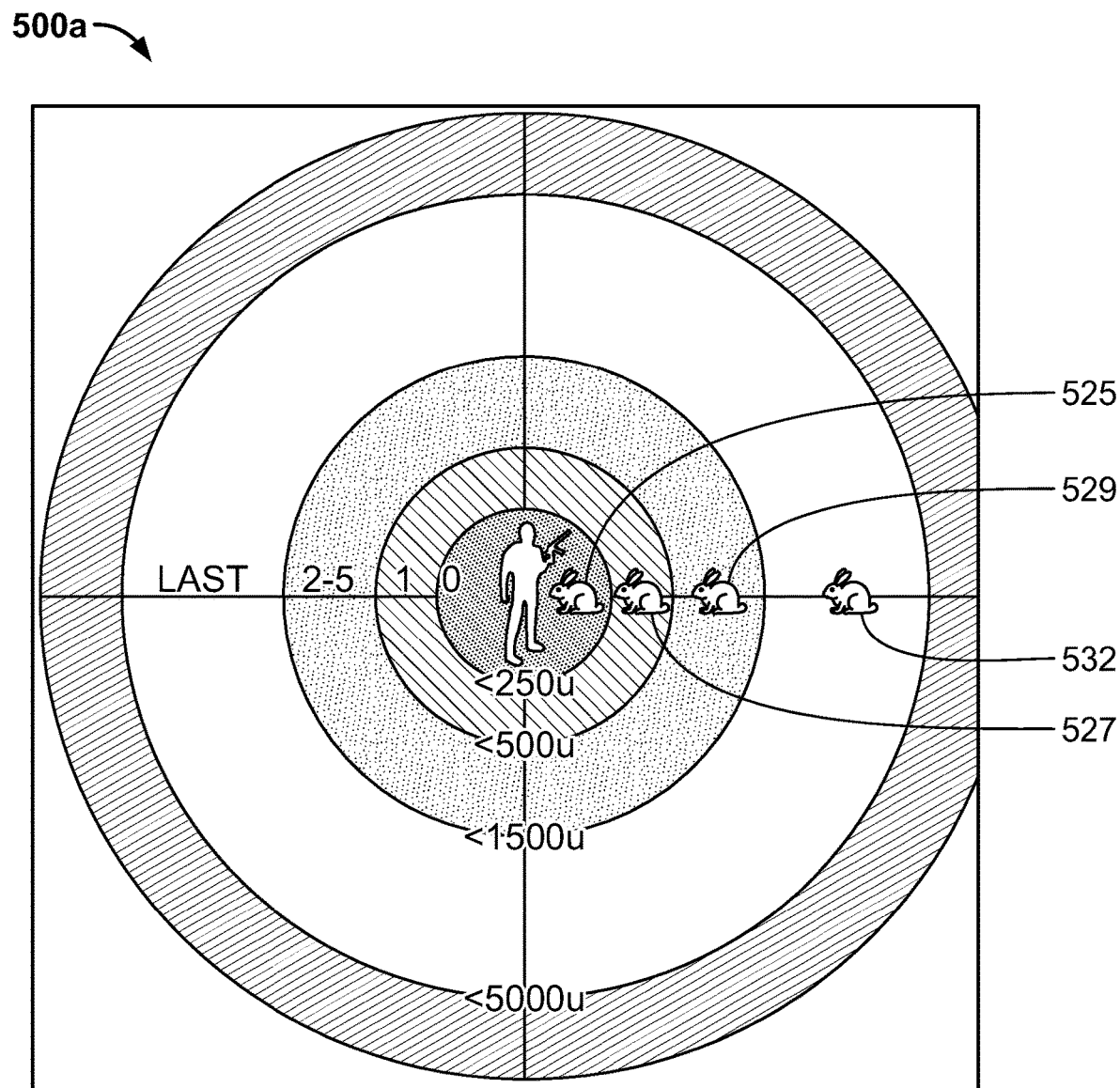
FIG. 5A shows a first visual guidance tool that enables a graphics artist to gauge the runtime efficiency of a set of LOD assets, in accordance with some embodiments of the present specification.

FIG. 5A shows a first visual guidance tool 500a that enables a graphics artist to gauge the runtime efficiency of a chain of LOD assets, in accordance with some embodiments of the present specification. In some embodiments, the runtime efficiency of a group of LODs is gauged in terms of the overall memory being used up by the LODs and GPU (Graphical Processing Unit) workload being incurred for rendering the LODs during gameplay. In embodiments, the hybrid LOD management module 132 is configured to auto-generate LODs along with the associated switch distances with an objective to ensure high runtime efficiency.

For example, in some embodiments, the module 132 may be configured to auto-generate LODs based on a predefined target reduction of 'r %' such that each auto-generated LOD has 'r %' less number of vertices than a prior LOD in a chain/group of LOD assets. In some embodiments, the predefined target reduction of r % is 50% Similarly, the module 132 determines the switch distances (for each of the LODs in the chain/group of LOD assets) based on a predefined geometric deviation or error threshold 'D' as described earlier in the method 200 of FIG. 2A.

However, the graphics artist may end up modifying one or more of the plurality of LOD-related attributes, characteristics or parameters (such as, but not limited to, those illustrated in the first and second GUIs 400a, 400b) of the auto-generated plurality of LODs. As a non-limiting example, the graphics artist may use the first and second GUIs 400a, 400b to modify the reduction % and/or the auto-generated switch distances due to various gameplay considerations. Modification of the plurality of LOD-related attributes, characteristics or parameters may, however, penalize the runtime efficiency of the LODs.

Therefore, an objective of the first tool 500a is to visually guide the graphics artist in terms of a plurality of predefined target ranges of distances (of an object from the camera) that may be adhered to for using each LOD, in a chain of LODs, so as to minimize incurring costs in terms of the runtime efficiency of the LODs. The tool 500a broadly emphasizes that the highest quality LODs need to be used for short distances of the object from the camera. For example, in accordance with some embodiments, a base $LOD_0$ 525 may be used within a first predefined target distance range of 0 to M units. In some embodiments, M is 250 inches. A first representative model $LOD_1$ 527 may be deployed within a second predefined target distance range of M and N units. In some embodiments, N is 500 inches. Most of the additional LODs 529 (example, $LOD_2$, $LOD_3$, etc.) may be deployed within a third predefined target distance range of N and O units. In some embodiments, O is 1500 inches. A last LOD 532 may be used for distances ranging between O and P units. In some embodiments, P is 5000 inches. In some embodiments, beyond P units the last LOD blinks-out (that is, is not rendered).

Figure 5B:
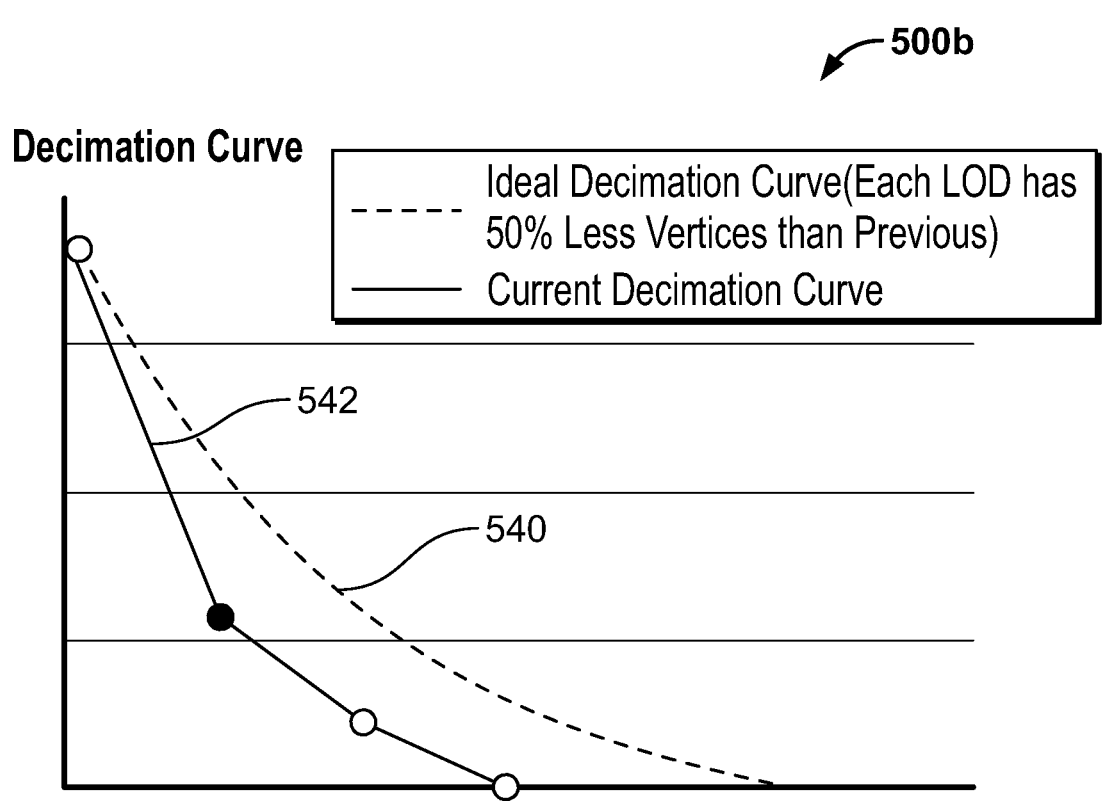
FIG. 5B shows a second visual guidance tool that enables the graphics artist to gauge the runtime efficiency of a chain of LOD assets, in accordance with some embodiments of the present specification.

FIG. 5B shows a second visual guidance tool 500b that enables a graphics artist to gauge the runtime efficiency of a chain of LOD assets, in accordance with some embodiments of the present specification. The tool 500b is in the form of a graph with LODs ($LOD_0$, $LOD_1$, $LOD_2$, $LOD_3$ and so on depending on the number of LODs in the chain of LOD assets) being plotted on the X-axis and reduction % being plotted on the Y-axis. The tool 500b illustrates a first curve 540 indicative of a decimation or reduction curve, for the chain of LODs, based on the predefined target reduction of 'r %', where r % is 50%, in accordance with some embodiments.

A second curve 542 is indicative of a current decimation or reduction curve, for the chain of LODs, based at least on the graphic artist's modification of the predefined target reduction of 'r %'. As can be observed, the second curve 542 is steeper than the first curve 540 indicating that the graphic artist's tweaking of at least the predefined target reduction of 'r %' has resulted in sharper or more aggressive reduction in the number of vertices for each LOD in the chain of LODs. This is desirable since, in some embodiments, the second curve 542 is indicative of improvement in the runtime efficiency of the LODs. However, if the graphic artist's tweaking of at least the predefined target reduction of 'r %' results in a third curve (not shown) that has a slope less steep than the first curve 540 it may indicate to the artist that the chain of LODs, corresponding to the third curve, would have lower runtime efficiency compared to those represented by the first curve 540. Accordingly, the graphic artist may take corrective measures and re-modify the LODs to ensure cutback in the undesired deviation of the third curve with respect to the first curve 540.

LOD Packing

In accordance with some aspects of the present specification, the hybrid LOD management module 132 performs LOD packing which, in some embodiments, is an offline process by which all vertex attributes (color, normal, texture coordinates, skinning weights, material ID) are stored in separate, compact streams of data for each LOD of a model.

In accordance with further aspects of the present specification, the module 132 further performs quantization that, in general, refers to mapping from a large set of values to a smaller set. In some embodiments, vertex position values (x, y, z) are mapped, with each of the three coordinates starting as 32-bit floating point values, to 75-bits total. By using the BoundsRadius (or modelRadius) it is ensured that a smaller target set of this mapping is within the model's bounds, which is much smaller than the original set of all real numbers. This ensures a minimum loss of vertex position fidelity, as it is a lossy form of data compression.

In some embodiments, object-space positional quantization is defined as follows:

Object-space positional quantization scale=(pos−boundsMid)/boundsRadius mask=0x1FFFFF packedPos=clamp((scale*0.5+0.5)*mask,0,mask)

where, Scale refers to how far a given vertex position is from the center of the model, normalized against the model's radius; Pos refers to a given vertex's (x, y, z) position; BoundsMid refers to the position (x, y, z) of the geometric center of the model; BoundsRadius is same as "modelRadius" described earlier in this document and refers to the distance from BoundsMid to the model vertex farthest from that point; Mask refers to a fixed value representing exactly 25-bits (or the maximum possible value that can be described with 25 bits) and is used to enforce each (x, y, z) positional component to be stored as 25-bits each, for a total of 75-bits; PackedPos refers to the final, quantized positional components (x, y, z), each consuming 25=bits; and Clamp refers to a standard arithmetic operation to force all positional (x, y, z) components to be between 0 and the maximum value that can be represented by 25-bits (that is, "mask").

Rendering Module

At runtime, the rendering module or engine 134 (in data communication with a client-side rendering module or engine 134') implements a plurality of instructions or programmatic code to determine which representation, version or LOD, out of a set, group or chain of LOD assets, to render for a given gameplay view or scene. Stated differently, once a chain of LOD assets along with associated switch distances (hereinafter referred to as 'offline authored switch distances') have been auto-generated offline for an object and, if required, further modulated by a graphics artist, the module 134 needs to select an appropriate LOD at an appropriate switch distance so as to enable consistent visuals and performance for all gameplay scenes across platforms while ensuring optimal runtime efficiency in terms of, at least, predefined target GPU performance and memory usage.

In accordance with aspects of the present specification, at runtime or gameplay, the module 134 applies at least one of a plurality of corrective factors to an offline authored switch distance, associated with each LOD of a chain of LOD assets, in order to determine a modulated switch distance for each LOD.

As an illustration, let us assume that the offline authored switch distances are so, si, 52, 53 and so on for a chain of LOD assets $LOD_0$, $LOD_1$, $LOD_2$, $LOD_3$ and so on. These offline authored switch distances are determined based on the method 200 of FIG. 2A and, if required, consequent to a graphic artist's interventions along the lines of the method 200b of FIG. 2B. During runtime, the module 134 is configured to apply at least one of the plurality of corrective factors to generate modulated switch distances $ms_0$, $ms_1$, $ms_2$, $ms_3$ and so on corresponding to $LOD_0$, $LOD_1$, $LOD_2$, $LOD_3$ and so on. Therefore, during runtime, the module 134 is configured to select and render a LOD on the basis of its associated modulated switch distance that is determined by modifying an offline authored switch distance of the LOD based on a plurality of variables such as, but not limited to, context of scene, FOV (Field Of View), type of camera, kind of object, GPU performance, platform used for rendering gameplay scenes, vertex processing efficiency, memory limits or budgets and scene or display resolution.

In some embodiments, the plurality of corrective factors correspond to the following variables—FOV (Field Of View) change, resolution of screen (or scene), rate of vertex processing throughput (that is, how many vertices are processed per second), general GPU performance (that is, dynamically reducing load on GPU to accommodate a predefined target workload), and available memory (that is, memory budget for a rendered gameplay scene). Accordingly, the plurality of corrective factors comprises:

FOV (Field Of View) scale—the module 134 monitors a player's FOV changes during gameplay and factors-in the monitored FOV changes to determine and generate modulated switch distances. As a non-limiting example, in a FPS (First Person Shooter) game, a player may pull out a sniper rifle and zoom in onto a scene. Weapon scope zooming is an exemplary scenario representative of a change in FOV. To account for this FOV change, the module 134 maps the FOV change to a FOV scaling factor and applies the FOV scaling factor to an offline authored switch distance.

In some embodiments, the FOV scaling factor is an inverse scaling factor. For example, if the FOV change corresponds to an FOV decrease of, say, 50% then the offline authored switch distances are increased by the FOV scaling factor (and vice versa) such that LODs corresponding to higher level details are retained in a gameplay scene for a longer duration.

Accordingly, in some embodiments, the FOV scaling factor is calculated using the following equations:

$$tanHalfFovY = \left(\frac{9}{16}\right)8tanHalfFovX$$

$$invFovScale = \frac{tanHalfFovY}{\left(\frac{9}{16}\right)*\tan(80.0*0.5)}$$

$$invFovScale = tanHalfFovY * 2.11867305$$

where, HalfFovY refers to half of a FOV angle along a vertical y-axis; and HalfFovX refers to half of a FOV angle along a horizontal x-axis. In some embodiments, the FovY (that is, the FOV angle along the vertical axis) is 80.0 degrees.

The aforementioned equations are based on an assumption that all runtime FOV changes occur only in a horizontal axis. Also, assuming a 16:9 aspect ratio, the module 134 determines how much of a FOV scale factor should be applied to maintain the same visual behavior at a fixed vertical FOV and aspect ratio. In embodiments, vertical FOV is used to ensure same results regardless of display aspect ratio (for example, 4:3, 16:9, and 16:10).

Scene or screen resolution scale—the module 134 monitors and determines a player's target screen resolution (that is, a resolution of the screen/display being used by the player for gameplay) and accordingly applies a screen resolution scaling factor to the offline authored switch distances to determine and generate modulated switch distances. As discussed earlier in this specification, the offline authored switch distances are calculated from geometric deviations or errors, for LODs in a chain of LOD assets, projected on a default 1080p screen. Consequently, the module 134 is configured to determine the screen resolution scaling factor, when the chain of LOD assets is rendered at resolutions above or below the default 1080p, to maintain visual/perceptual consistency across different screen or display resolutions.

For example, since one of the objectives is to minimize pixel popping, and a 4k resolution display has a higher pixel density compared to the default 1080p display, the screen resolution scaling factor ensures that a relative severity of all pixel pops is the same at the 4k display as at the 1080p display. This means scaling all offline authored switch distances so that the LODs are rendered at a farther/closer distance to match the player's target screen resolution.

Accordingly, in some embodiments, the screen resolution scaling factor is calculated using the following equations:

nearClipDist=1.0/tan(defaultFov/2.0)

screenRatio0=targetScreenHeight/defaultScreenHeight angle0=tan$^{-1}$(screenRatio0/nearClipDist)

angle1=tan$^{-1}$(1.0/nearClipDist)

sceneResScale=sin(angle1)/sin(angle0)

The aforementioned equations are based on an assumption that all offline authored switch distances were based on the geometric deviation or error projected on the default 1920×1080 display. This means that the "defaultScreenHeight" is always 1080 and the "defaultFOV" is always 65.0. The equations are solved for the screen resolution scaling factor that ensures a "targetScreenHeight" of 2160 produces the same projected geometric deviation or error. In some embodiments, the module 134 calculates the screen resolution scaling factor once when the player uses his client device 110 (FIG. 1) to connect to the one or more game servers 105.

Vertex processing efficiency scale—an objective of using this corrective factor is to ensure that the time for vertex processing is approximately same (or does not vary substantially) across all target gaming platforms for a gameplay scene. This will yield more deterministic performance and prevent from having to customize scenes or rendering features across platforms. In some embodiments, the vertex processing time does not vary beyond a range of 0.1 to 30 milliseconds across the target platforms. In one embodiment, for the Sony PlayStation 4 platform at 1080p, the vertex processing time does not vary beyond a range of 0.93 to 1.58 milliseconds.

In embodiments, the vertex processing efficiency is a combination of at least GPU power, specifications or capabilities, memory bandwidth or space and shader compiler differences. Taking these variables into account, a plurality of empirical measurements, in vertex processing efficiency, are taken across platforms to determine an approximate vertex processing efficiency scaling factor for each of the target platforms (and stored in the at least one database 120 for access by the module 134). In an embodiment, a suite of reference meshes of varying complexities were rendered a large number (for example, on the order of hundreds) of times on all target platforms. Detailed GPU statistics were gathered from each step of the vertex processing pipeline for each platform. Those were then averaged and normalized against the platform used for most model LOD tuning—such as, for example, a PS4, running at 1080p.

Accordingly, the module 134 applies the vertex processing efficiency scaling factor, associated with a gaming platform, to offline authored switch distances (for LODs) to generate modulated switch distances optimized for the gaming platform.

General GPU performance scale—in embodiments, the module 134 is configured to monitor GPU workload on a player's client device and apply a GPU performance scaling factor if the GPU workload causes a predefined maximum GPU frame latency to exceed when a gameplay scene is rendered on the player's client device. In some embodiments, the predefined maximum GPU frame latency is 16.67 milliseconds for rendering gameplay scenes (and is independent of display resolution).

Accordingly, in some embodiments, the GPU performance scaling factor is calculated using the following equation:

gpuPerfScale=mapToLogCurveWithHysteresis(gpuFrameTime)

If while rendering a gameplay scene, the GPU workload causes the predefined maximum GPU frame latency to be reached or exceeded then, in accordance with the aforementioned equation, the GPU frame time is mapped to a log curve in order to determine the GPU performance scaling factor. Thus, if the GPU workload, at the player's client device, results in the predefined maximum GPU frame latency to be reached or exceeded, the module 134 applies the GPU performance scaling factor to the offline authored switch distances (for LODs) to generate modulated switch distances as a result of which the LODs switch (to less complex LODs or to LODs with fewer number of geometric primitives) sooner (that is, at a nearer distance to the virtual camera) thereby reducing GPU workload.

Memory budget-based bias—in some embodiments, the gaming system of the present specification employs compute shaders for all skinned characters in the game. The compute shaders write transform vertex data out to UAVs (Unordered Access view) of fixed size. However, in a hypothetical scenario, if a large number of players, say 65, collect in the same room in a gameplay scene and each player is represented by a corresponding LOD having a large number of vertices (say upwards of 100k), then the rendered gameplay scene may start flickering since the UAV, a memory resource, has a fixed size or budget that is being exceeded while attempting to render the gameplay scene.

To avoid visual artifacts (such as flickering) while skinning all visible LODs, the module 134 is configured to monitor and determine if a first predetermined memory space threshold, for the UAV, is being exceeded while rendering a gameplay scene. If the first predetermined memory space threshold is exceeded, the module 134 applies a first budge-based biasing factor to the offline authored switch distances in order to generate modulated switch distances for skinned LODs. In other words, the first budge-based biasing factor results in dynamically scaling down of the LODs and reducing vertex counts.

In embodiments, the geometry pipeline buffers, that handle vertex data, also have a fixed size or budget. Accordingly, the module 134 is configured to monitor and determine if a second predetermined memory space threshold, for the geometry pipeline buffers, is being exceeded while rendering a gameplay scene. If the second predetermined memory space threshold is exceeded, the module 134 applies a second budge-based biasing factor across all content to ensure that the total vertex count for the gameplay scene remains within budget.

Accordingly, the second budge-based biasing factor is determined based on the following steps:

```
lodThreshold=[geoLimit*minPcnt, geoLimit*maxPcnt]
if ( curGeoUsage >= lodThreshold[0] )
{
   if ( geoBias == geoBiasStep )
     geoBias = 2.0* geoBiasStep
   else
     geoBias = geoBiasStep
}
else if (curGeoUsage >= lodThreshold[1] )
   geoBias = max( geoBias - geoBiasDecay*dT, 0.0 )
```

The aforementioned steps of determining the second budget-based biasing factor may signify that: a) for each frame, monitoring how close a current rendered scene memory size is to a maximum geometry pipeline buffer limit; b) if the second predetermined memory space threshold (which, in some embodiments, is 85% of the maximum geometry pipeline buffer limit) is passed/exceeded for a frame then a predefined non-zero distance bias value (that is, the second budge-based biasing factor) is established; c) this non-zero bias value or the second budge-based biasing factor is added to all runtime LOD distance calculations; d) if the second predetermined memory space threshold is exceeded again in the very next frame, then the distance bias value or the second budge-based biasing factor is doubled (with reference to the predefined non-zero distance bias value at step b); and e) if for a frame the memory size of a rendered scene falls below the second predetermined memory space threshold, a decay factor is applied to the second budge-based biasing factor until it reaches 0 again.

In some embodiments, each of the steps a, b, c, d, and e above are repeated for global skinning UAV limit. The only difference is that the skinning UAV limit bias (or, in different terms, the first budge-based biasing factor) is only added to switch distances calculated for models that are animated/skinned (for example, characters, and vehicles). In some embodiments, the first and second budge-based biasing factor can be combined (or added).

In various embodiments, the module 134 determines modulated switch distance $SD_{modulated}$ for a LOD as a function of a corresponding offline authored switch distance $SD_{offline}$ and the plurality of corrective factors. Specifically, in some embodiments, a modulated switch distance for a LOD is calculated using the following equation:

$$\text{lodDist or } SD_{modulated} = \|SD_{offline}\|*\text{invFovScale}*\text{scenResScale}*\text{vertexProcessingScale}*\text{gpuPerfScale}+\text{geoBias}$$

where, $SD_{modulated}$ is a modulated switch distance for a LOD, $SD_{offline}$ is an offline determined switch distance for the LOD, invFovScale is a FOV scaling factor, scenResScale is a scene resolution scaling factor, vertexProcessingScale is a vertex processing efficiency scaling factor, gpuPerfScale is a GPU performance scaling factor, and geoBias is a memory budge-based biasing factor (including first and/or second biasing factors corresponding to memory limits for UAVs and/or geometry pipeline buffers, respectively).

Thus, during runtime, the module 134 is configured to select and render one or more LOD assets on the basis of the associated modulated switch distances that are determined by modifying the associated offline authored switch distances for the one or more LOD assets based on at least one of the plurality of corrective factors. In some embodiments, the modulated switch distances are determined by modifying the offline authored switch distances for the one or more LOD assets based on at least two of the plurality of corrective factors.

Case, Context or Scenario-Based Interventions

In accordance with further aspects of the present specification, at runtime, the module 134 implements a plurality of instructions or programmatic code to monitor gameplay scenes and apply one or more case, context or scenario based interventions aimed at striking a balance between visual or perceptual quality and GPU performance. In embodiments, the one or more case, context or scenario based interventions are those related to a size of the LOD being rendered, procedural vertex motion or animation for the LOD, whether the LOD represents a static object, and streaming bandwidth deterioration between the player's client device and the one or more game servers. Accordingly, in some embodiments, the following case, context or scenario based interventions are implemented by the module 134:

Reject small objects—In embodiments, at runtime, the module 134 is configured to query or monitor each frame being rendered for a gameplay scene and automatically reject or stop rendering LODs of objects whose projected size (on a display screen) is smaller than a predefined size threshold of 'L' units. In some embodiments, 'L' ranges from 0.01 to 24.0 inches. This ensures that the GPU is never tasked to render models that may have sub-pixel pieces of geometry or that may have sub-optimal LOD configurations. For example, there may be a scenario where a last LOD (of a chain of LOD assets) for a not-so-significant object, such as a small bottle, ball or a boulder, comprised of a large amount of geometric primitives (say, 100k polygons). In such a scenario, the module 134 ensures that the last LOD of the object is never drawn beyond a small number of geometric primitives (say, 1000 polygons).

In some embodiments, the module 134 dynamically applies a size-based scaling factor to the predefined size threshold of 'L' units based on parameters that tend to affect general GPU performance. In some embodiments, with each drop in scene resolution (up to, say, 15), the size-based scaling factor is increased to match the new scene resolution using the same equation as that of the "screen resolution scaling factor" described earlier in this specification. For example, if screen or scene resolution dynamically drops by z %, the predefined size threshold is scaled accordingly by applying the sized-based scaling factor. Thus, if screen or scene resolution dynamically drops then the predefined size threshold also drops and vice versa.

Procedural vertex motion or animation—In various scenes, vertex positions of polygon meshes of one or more LODs (rendered in the scenes) may be animated. Such procedural vertex motion or animation is, however, quite expensive in terms of memory usage and GPU workload. Therefore, in embodiments, at runtime, the module 134 is configured to query or monitor a gameplay scene being rendered and automatically fade, completely ignore or switch off procedural vertex motion or animation for more distant LODs (that is, LODs, in a set of LOD assets, that are rendered at farther distances from the camera). In some embodiments, the more distant LODs are defined as those LODs that are rendered at distances ranging from 256 to 512 inches from the virtual camera. In some embodiments, the module 134 starts to fade out vertex motion at 256 inches and at 512 inches stops all motion. This applies to whichever model LOD is chosen at 512 inches from the virtual camera. Such modulation of procedural vertex motion or animation helps at least with a) shadow draws by increasing frame-to-frame coherency of cached shadow caster states and b) for opaque draws when there are a large number of objects (having procedural vertex animation) such as, for example, trees, grass or rippling water in a scene.

Static models—In embodiments, the module 134 enables LODs (in a set of LOD assets) corresponding to a 'dynamic' object to LOD-out (that is, switch from a more complex LOD to less complex LODs and to a last LOD more quickly. For example, move from $LOD_0$ to $LOD_1$ to $LOD_2$ and so on more quickly) as part of runtime scaling. Stated differently, by applying the plurality of corrective factors (field of view scaling, scaling for resolution of screen, rate of vertex processing throughput scaling, GPU performance scaling and memory-budget based biasing) to offline authored switch distances, 'dynamic' object LODs may be made to LOD-out faster (compared to switching of the LODs based on the offline authored switch distances) to optimize visual fidelity and GPU performance or workload.

However, in accordance with aspects of the present specification, the module 134 is configured to either delay or not allow LODs, corresponding to a 'static' object, to LOD-out earlier than designated by the offline authored switch distances of the LODs. This prevents players using lower-end platforms (or client devices) from gaining unfair competitive advantage vis-à-vis players using higher-end platforms. For example, during a gameplay scene a player may be using a static object, such as a wall, boulder or a barrel, as cover. Now, if the scene causes a GPU usage spike then, on a higher-end platform, as a result of an application of screen resolution scaling and/or GPU performance scaling factors the LODs corresponding to the static object may switch to less complex LODs or the last LOD much faster thereby causing the static object to disappear from the scene earlier compared to the same scene being rendered on a lower-end platform. In other words, the static object LOD as cover would be visible for a longer duration in the scene being rendered on the lower-end platform compared to the duration of visibility of the static object LOD in the same scene being rendered on the higher-end platform due to runtime scaling.

Streaming—In embodiments, each LOD, in a chain of LOD assets, is loaded or rendered on-demand. However, streaming bandwidth and memory usage pressures may vary during gameplay. Consequently, if a more complex $LOD_0$ is required to be loaded on-demand in a gameplay scene and suddenly the streaming bandwidth dropped (or is insufficient) for the player's client device then the more complex $LOD_0$ may actually not render on the player's client device due to bandwidth limitations. To address such scenarios, the module 134 is configured to monitor streaming bandwidth and memory usage corresponding to each client device and recursively attempt to render LODs in accordance with a LOD fallback plan. In some embodiments, the LOD fallback plan is directed towards rendering a less complex LOD, from a chain of LOD assets, if a more complex LOD cannot be rendered on-demand due to streaming bandwidth degradation and/or memory usage spikes. Stated differently, if $LOD_0$ cannot be rendered then the module 134 would automatically attempt to render $LOD_1$ and if $LOD_1$ also cannot be rendered (that is, the streaming bandwidth and/or memory availability is not sufficient to enable rendering $LOD_1$) then the module 134 would automatically fallback to rendering $LOD_2$ and so on.

Figure 6:
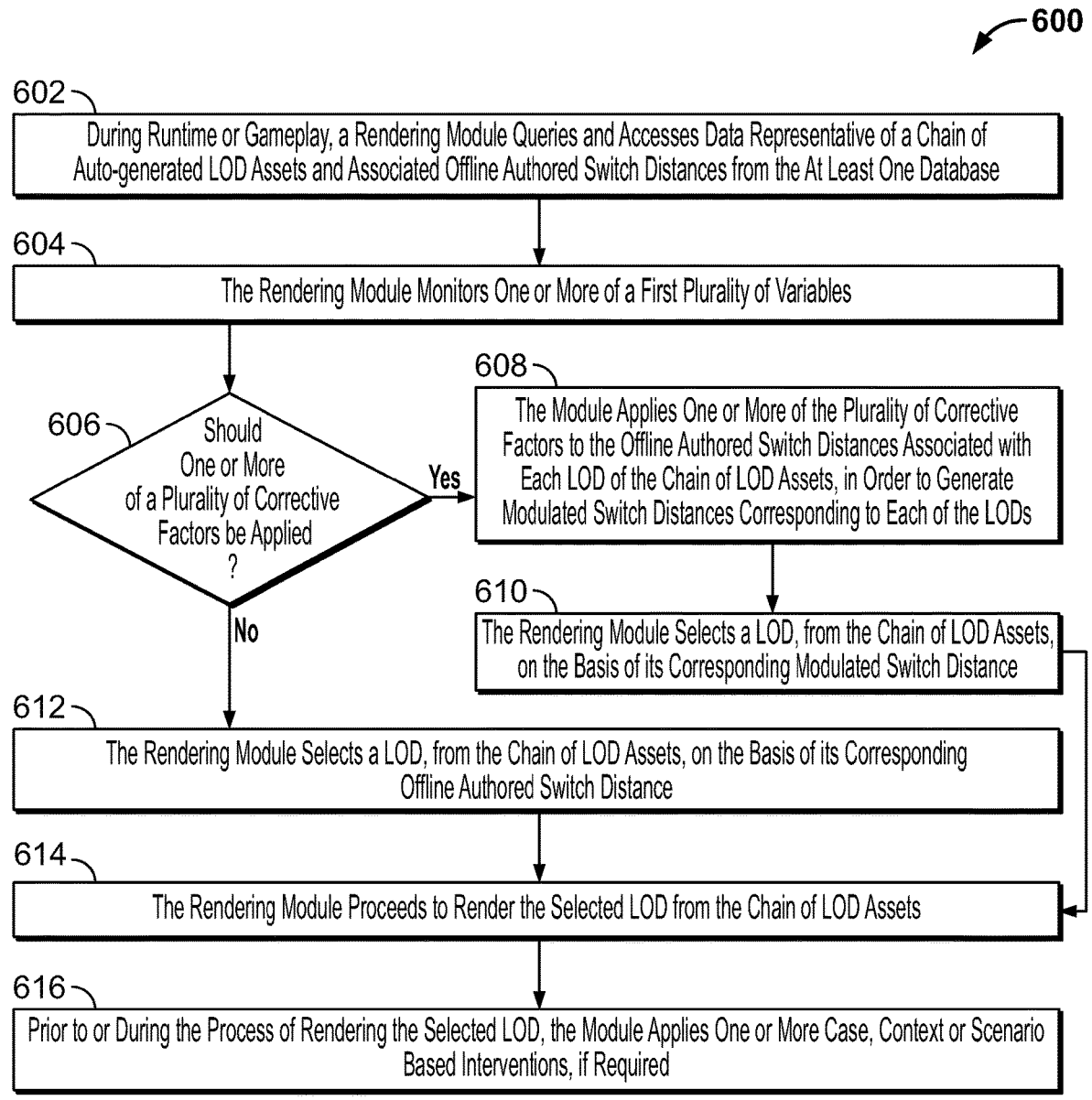
FIG. 6 is a flowchart of a plurality of exemplary steps of a method of selecting a geometric representation, version or LOD, from a set of LOD assets, for rendering during runtime, in accordance with some embodiments of the present specification.

FIG. 6 is a flowchart of a plurality of exemplary steps of a method 600 of selecting a geometric representation, version or LOD, from a chain of LOD assets, for rendering during runtime, in accordance with some embodiments of the present specification. In embodiments, the method 600 is implemented, during runtime, by the rendering module or engine 134 (in data communication with the client rendering module or engine 134'). In embodiments, the chain of LOD assets (along with associated switch distances) is auto-generated offline by module 132 and, if required, further modulated by a graphics artist in accordance with methods 200, 220 of FIGS. 2A, 2B.

Referring now to FIGS. 1 and 6, at step 602, during runtime or gameplay, the rendering module 134 queries and accesses data representative of the chain of LOD assets and associated offline authored switch distances from the at least one database 120.

At step 604, the rendering module 134 monitors one or more of a first plurality of variables related to a player's gameplay and/or client device 110. In some embodiments, the first plurality of variables comprise FOV change, resolution of screen (or scene), rate of vertex processing throughput, general GPU performance, and available memory (that is, memory budget for a rendered gameplay scene).

At step 606, based on monitoring of one or more of the first plurality of variables, the rendering module 134 determines if one or more of a plurality of corrective factors should be applied to the offline authored switch distances associated with each LOD of the chain of LOD assets. If yes, then at step 608, the module 134 applies one or more of the plurality of corrective factors to the offline authored switch distances associated with each LOD of the chain of LOD assets, in order to generate modulated switch distances corresponding to each of the LODs. In various embodiments, the plurality of corrective factors comprise FOV scaling factor, screen resolution scaling factor, vertex processing efficiency scaling factor, GPU performance scaling factor and memory budget-based biasing factor. Thereafter, at step 610, the rendering module 134 selects a LOD, from the chain of LOD assets, on the basis of its corresponding modulated switch distance.

However, if it is determined that none of the plurality of corrective factors need to be applied, then, at step 612, the rendering module 134 selects a LOD, from the chain of LOD assets, on the basis of its corresponding offline authored switch distance.

At step 614, the module 134 proceeds to render the selected LOD from the chain of LOD assets. Finally, prior to or during the process of rendering the selected LOD, the module 134, at step 616, applies one or more case, context or scenario based interventions, if required. In embodiments, the one or more case, context or scenario based interventions are those related to a size of the LOD being rendered, procedural vertex motion or animation for the LOD, whether the LOD represents a static object, and streaming bandwidth deterioration between the player's client device 110 and the one or more game servers 105.

Proxy LODs

Some game modes are characterized by large, highly complex topographical maps. As a non-limiting illustration, a portion of a large game map may include static content such as a city block containing a bank building with numerous amounts of detailing comprising, say, 10,000 object models, 5 million vertices and 30,000 materials. Such large, high object density, complex game maps pose challenges in terms of memory budgets and streaming bandwidth pressures. In some cases these maps cannot be efficiently rendered at a frame rate of 60FPS (for the default 1080p display) even if all distant static object models were represented by their respective simplest LODs. This is so, because rendering such high object density, complex game maps requires just too many draw calls and too many sub-pixel triangles (or geometric primitives) for a GPU to efficiently deal with without breaching the predefined maximum GPU frame latency.

To address this issue and as part of an offline process, in some embodiments, a large, high object density, complex game map is broken down or segmented into a plurality of grid cells or areas. In some embodiments, a size of each of the plurality of grid cells or areas is not uniform and varies depending upon a density or complexity of static content encompassed within each cell and based on streaming and/or memory budgets or limits. In some embodiments, by default, the game map is automatically divided into uniformly-sized (for example, 10,000×10,000 units) grid cells or areas. Designers then have the power to further divide these grid cells into smaller ones of arbitrary dimensions, for gameplay or runtime budgeting refinement.

Figure 7:
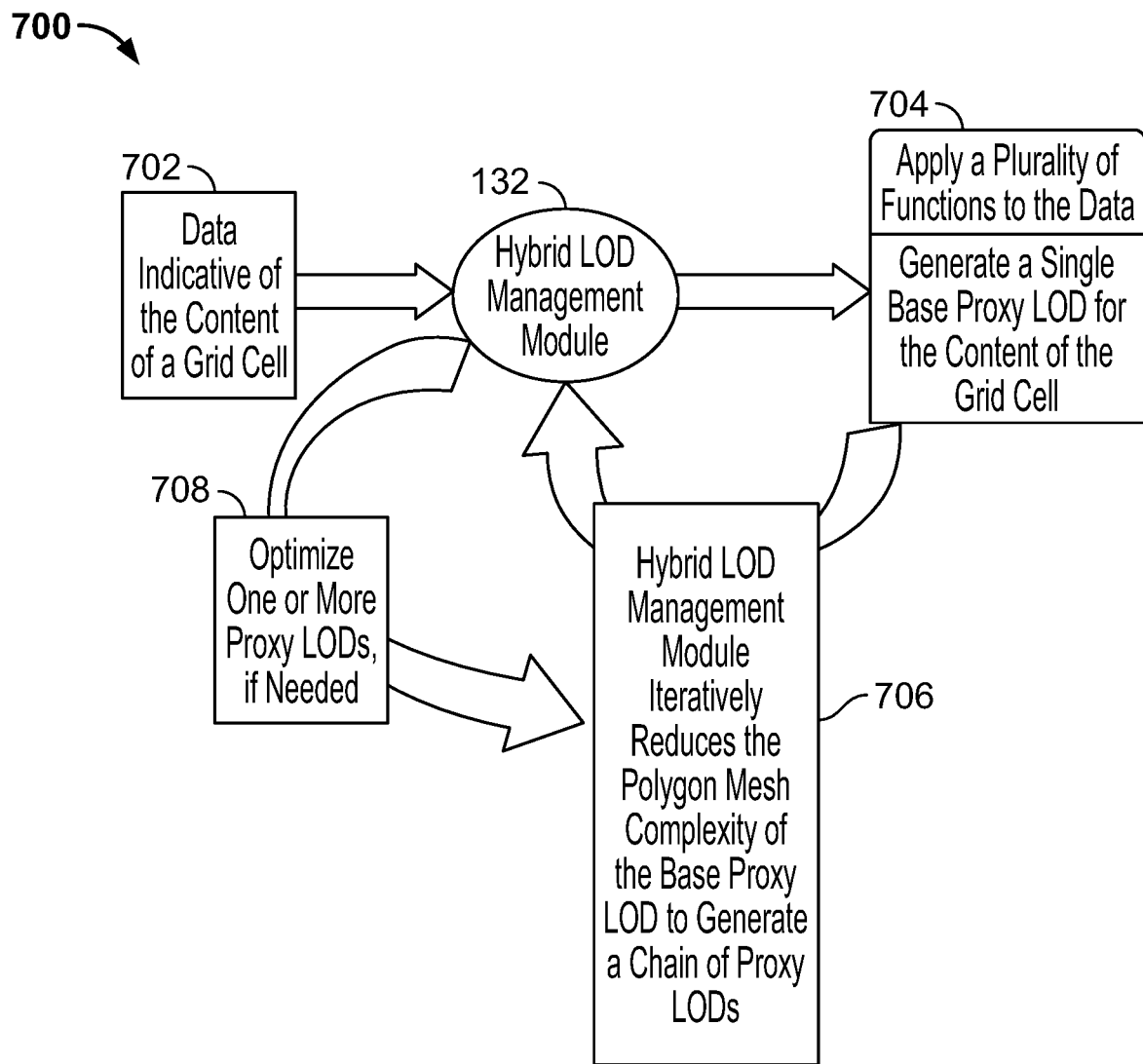
FIG. 7 is a workflow illustrating a plurality of exemplary steps of automatically generating a set of proxy LODs for contents of a grid cell of a game map, in accordance with some embodiments of the present specification.

FIG. 7 is a workflow 700 illustrating a plurality of exemplary steps of automatically generating a chain of proxy LODs for contents of a grid cell of a game map that has been segmented into a plurality of grid cells, in accordance with some embodiments of the present specification. In some embodiments, the workflow 700 is implemented, offline, by the hybrid LOD management module or engine 132. While the workflow 700 is described with reference to its execution by the module 132 it should be appreciated that in some embodiments the module 132 is executed, in data communication with the client LOD management module 132', via the at least one non-player client device 110g (FIG. 1).

At step 702, the module 132 receives, as input, data indicative of the contents of the grid cell. In various embodiments, the contents include a plurality of static object models represented by their respective LODs.

At step 704, the module 132 applies one or more of a plurality of functions to the data in order to auto-generate a single base model or base proxy LOD representative of the contents of the grid cell (or representative of all constituent LODs of the grid cell). The module 132 also auto-generates or assigns a base proxy switch distance corresponding to the base proxy LOD. In some embodiments, the plurality of functions includes:
  Remeshing—application of this function combines or coalesces the plurality of static object models of the grid cell into one mesh thereby reducing an amount of draw calls that the plurality of object models of the grid cell consume. Remeshing creates a new geometry for the constituent meshes (of the plurality of static object models) that can be used as a proxy for distant rendering.
  Material baking—application of this function combines several unique materials (that constitute the content of the grid cell) into one, which reduces overall rendering footprint in terms of memory and GPU performance.

At step 706, the module 132 iteratively reduces the polygon mesh complexity (that is, reduce the number of polygons) of the base proxy LOD to generate a chain or set of successive proxy LODs. The successive proxy LODs, in the chain of proxy LODs, being characterized by a descending order of complexity. In some embodiments, a proxy LOD is generated based on its geometric deviation or error approaching, but not exceeding, a predefined threshold 'D' compared to an immediate prior proxy LOD. Also, a proxy switch distance for each proxy LOD is calculated (by the module 132) at which the threshold 'D', when projected on a display of a default resolution, consumes or occupies a predefined number of pixels 'P'. In some embodiments, the default resolution corresponds to a 1080p display. In some embodiments, the predefined number of pixels 'P' ranges from 2.0 to 100.0 pixels for a 1080p display.

Thus, in some embodiments, the step 706 of auto-generating the chain or set of successive proxy LODs along with their associated proxy switch distances, comprises implementing the method 200 of FIG. 2A (wherein the step 202 is adapted to receive the base proxy LOD and the base proxy switch distance as inputs to the LOD management module during a first iteration of the steps of the method 200).

Specifically, the step 706 includes the following sub-steps: a) receiving, as input into a LOD management module, the base proxy LOD and the associated base proxy switch distance; b) generating, as second output by the LOD management module, a first proxy LOD by iteratively reducing a polygon mesh complexity of the base proxy LOD until a maximum geometric deviation of the first proxy LOD approaches, but does not exceeds, a predefined threshold value with respect to the base proxy LOD. In some embodiments, the predefined threshold value ranges from 0.001 to 24.0 inches; c) generating, as third output by the LOD management module, a first proxy switch distance at which the predefined threshold value, when projected on a display of a default resolution, comprises a predefined number of pixels. In some embodiments, the predefined number of pixels ranges from 2.0 to 100.00 inches; and d) storing, by the LOD management module, the second output in association with the third output if a difference between the base proxy switch distance and the first proxy switch distance is greater than a predefined threshold distance. However, wherein if a difference between the base proxy switch distance and the first proxy switch distance is less than or equal to the predefined threshold distance, then the second output and the third output are not stored and instead provided as input to the LOD management module. In some embodiments, the predefined threshold distance ranges from 0.001 to 24.0 inches. Sub-steps a), b), c) and d) are repeated until at least one of first or second conditions is satisfied, wherein the first condition corresponds to a size of the first proxy LOD being determined to be less than or equal to a predefined size, and wherein the second condition corresponds to a predefined maximum number of the plurality of proxy LODs being generated. In some embodiments, the predefined size ranges from 4.0 to 1000.0 inches, and wherein a predefined maximum number of the plurality of proxy LODs is 6.

Consequently, each proxy LOD has an associated proxy switch distance at which the proxy LOD is rendered for the grid cell.

Finally, at step 708, the module 132 enables a computer graphic artist or designer to optimize and modulate one or more of the auto-generated proxy LODs and their associated proxy switch distances, if needed. In embodiments, the module 132 may generate one or more GUIs to prompt the graphics artist and receive inputs related to various proxy LOD related attributes or parameters described with reference to FIGS. 4A and 4B. In embodiments, the proxy LOD related attributes or parameters include: auto LOD generation, LOD count, a LOD index at which to start generating the plurality of LODs, distance scale, tri-coverage LOD threshold, LOD blink-out, reduction %, weight settings to modify a number of triangles, edges and points, importance settings to modify geometry, texture coordinate, normal, material ID, object ID, skinning and vertex color, and settings to modify a maximum deviation, weld threshold, vertex regularization, surface area and/or normal split tolerance. Thus, in some embodiments, the step 708 comprises implementing the method 220 of FIG. 2B.

It should be appreciated that since the proxy switch distances for each proxy LOD is known, the complexity of remeshing inputs can be reduced and visual coherence can be ensured by choosing (as inputs at step 702) only static model LODs which would be visible at corresponding proxy LODs. For example, if a proxy switch distance was 5000 units, it is ensured that all models used as inputs to the corresponding proxy LOD use their LOD representations that would be otherwise selected at 5000 units. This is advantageous since a large number (sometimes in 1000's) of small models can be omitted from proxy LOD generation as a result of them LOD'ing out of visibility prior to the proxy switch distance they would otherwise be included in.

Also, when any modification is made to the static geometry of a game level, all proxy LODs which are sourced from these bits of static geometry are automatically regenerated. This is done by establishing cell residency for all geometry in the game map. This cell residency is then used to rebuild only proxy LODs which represent those grid cells. In embodiments, every piece of static geometry has a bounding box. The x-y coordinates of the center point of the bounding box exists in exactly one world grid cell. The piece of static geometry associated with that bounding box is then assigned to that grid cell.

In accordance with some aspects of the present specification, there are multiple levels of caching in place to ensure that proxy LOD creation is as efficient as possible. When a new proxy LOD is generated, the geometry and material associated with that model are added to a distributed cache, shared across all designers and/or developers. When another designer tries to build that same proxy LOD model, the module 132 detects that all inputs match a proxy LOD model that has already been added to the distributed cache. In such a case, the cached assets are pulled directly instead of remeshing, thus saving on map iteration times.

In some embodiments, the geometry and material associated with the new proxy LOD are stored using a distributed caching system such as, for example, developed by ATVI called "Bill". The newly generated proxy LOD data are first cached locally on standard HDD (Hard Disk Drive) storage, then distributed to standard server storage, and thereafter copied to the local caches (HDD storage) of various developers. In embodiments, this process occurs automatically in the background.

The above examples are merely illustrative of the many applications of the system of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

We claim:

1. A method for generating level of detail (LOD) visual assets in a portion of a game map in a multi-player video game, wherein the method is performed by programmatic code executed by one or more processors, the method comprising:
receiving data associated with said portion of the game map;
generating a first LOD visual asset representative of the data and an associated first switch distance;
generating a second LOD visual asset by iteratively reducing a mesh characteristic of the first LOD visual asset until a function of the second LOD visual asset approaches a predefined threshold value;
generating a second switch distance at which the second LOD visual asset, when projected on a display having a first resolution, comprises a predefined number of pixels; and
displaying the second LOD visual asset at the second switch distance only when a difference between the first switch distance and the second switch distance is greater than a predefined distance.

2. The method of claim 1, wherein the mesh characteristic is a mesh complexity.

3. The method of claim 1, wherein the function is a maximum geometric deviation.

4. The method of claim 1, wherein the game map is segmented into a plurality of grid cells and wherein the portion is one grid cell of the plurality of grid cells.

5. The method of claim 4, wherein the grid cell further comprises a plurality of static object models and wherein each static object model of the plurality of static object models is represented by a LOD visual asset.

6. The method of claim 1, wherein the first LOD visual asset is generated by applying a function to the data and wherein the function is at least one of remeshing or material baking.

7. The method of claim 1, wherein, if a difference between the first switch distance and the second switch distance is less than or equal to the predefined threshold distance, then generating a third LOD visual asset by iteratively reducing a mesh of the second LOD visual asset.

8. The method of claim 1, wherein the predefined threshold value is a maximum distance between vertices in the first LOD visual asset and closest corresponding points on the second LOD visual asset.

9. The method of claim 1, wherein the predefined threshold value ranges from 0.001 to 24.0 inches.

10. The method of claim 1, wherein the predefined number of pixels ranges from 2.0 to 100.00 pixels.

11. The method of claim 1, wherein the predefined threshold distance ranges from 10 to 100 feet in a distance scale of the multi-player video game.

12. A computer readable non-transitory medium comprising a plurality of executable programmatic instructions wherein, when said plurality of executable programmatic instructions are executed by a processor in a computing device, a process for generating level of detail (LOD) visual assets in a portion of a game map in a multi-player video game is performed, the plurality of executable programmatic instructions comprising:
receiving data associated with said portion of the game map;
generating a first LOD visual asset representative of the data and an associated first switch distance;
generating a second LOD visual asset by iteratively reducing a mesh characteristic of the first LOD visual asset until a function of the second LOD visual asset approaches a predefined threshold value;
generating a second switch distance at which the second LOD visual asset, when projected on a display having a first resolution, comprises a predefined number of pixels; and
displaying the second LOD visual asset at the second switch distance only when a difference between the first switch distance and the second switch distance is greater than a predefined distance.

13. The computer readable non-transitory medium of claim 12, wherein the mesh characteristic is a mesh complexity.

14. The computer readable non-transitory medium of claim 12, wherein the function is a maximum geometric deviation.

15. The computer readable non-transitory medium of claim 12, wherein the game map is segmented into a plurality of grid cells and wherein the portion is one grid cell of the plurality of grid cells.

16. The computer readable non-transitory medium of claim 15, wherein the grid cell further comprises a plurality of static object models and wherein each static object model of the plurality of static object models is represented by a LOD visual asset.

17. The computer readable non-transitory medium of claim 12, wherein the first LOD visual asset is generated by applying a function to the data and wherein the function is at least one of remeshing or material baking.

18. The computer readable non-transitory medium of claim 12, wherein, if a difference between the first switch distance and the second switch distance is less than or equal to the predefined threshold distance, then generating a third LOD visual asset by iteratively reducing a mesh of the second LOD visual asset.

19. The computer readable non-transitory medium of claim 12, wherein the predefined threshold value is a maximum distance between vertices in the first LOD visual asset and closest corresponding points on the second LOD visual asset.

20. The computer readable non-transitory medium of claim 12, wherein the predefined threshold value ranges from 0.001 to 24.0 inches.

21. The computer readable non-transitory medium of claim 12, wherein the predefined number of pixels ranges from 2.0 to 100.00 pixels.

22. The computer readable non-transitory medium of claim 12, wherein the predefined threshold distance ranges from 10 to 100 feet in a distance scale of the multi-player video game.

* * * * *